United States Patent
Buege et al.

(10) Patent No.: US 11,273,978 B2
(45) Date of Patent: Mar. 15, 2022

(54) REFUSE VEHICLE WITH ELECTRIC LIFT

(71) Applicant: Oshkosh Corporation, Oshkosh, WI (US)

(72) Inventors: Wallace Buege, Oshkosh, WI (US); Martin Schimke, Oshkosh, WI (US); Joshua D. Rocholl, Rochester, MN (US); Jerrod Kappers, Oshkosh, WI (US); Andrew Kotloski, Oshkosh, WI (US)

(73) Assignee: Oshkosh Corporation, Oshkosh, WI (US)

(*) Notice: Subject to any disclaimer, the term of this patent is extended or adjusted under 35 U.S.C. 154(b) by 14 days.

(21) Appl. No.: 16/851,235

(22) Filed: Apr. 17, 2020

(65) Prior Publication Data
US 2020/0346858 A1 Nov. 5, 2020

Related U.S. Application Data

(60) Provisional application No. 62/843,067, filed on May 3, 2019.

(51) Int. Cl.
| | | |
|---|---|---|
| *B65F 3/08* | (2006.01) | |
| *B65F 3/02* | (2006.01) | |
| *B60P 1/44* | (2006.01) | |

(52) U.S. Cl.
CPC .............. *B65F 3/08* (2013.01); *B60P 1/4421* (2013.01); *B65F 2003/023* (2013.01); *B65F 2003/0269* (2013.01); *B65F 2003/0276* (2013.01)

(58) Field of Classification Search
CPC .................. B65F 3/08; B65F 2003/023; B65F 2003/0266; B65F 2003/0269; B65F 2003/0276

(Continued)

(56) References Cited

U.S. PATENT DOCUMENTS

| | | |
|---|---|---|
| 1,151,479 A | 8/1915 | Kurtz |
| 2,263,199 A | 11/1941 | Wachter et al. |

(Continued)

FOREIGN PATENT DOCUMENTS

| | | | |
|---|---|---|---|
| CN | 105501766 B | 3/2018 | |
| CN | 107985873 A * | 5/2018 | ................ B65F 3/08 |

(Continued)

OTHER PUBLICATIONS

Boivin Evolution Products, https://en.bev.ca/produits, Retrieved on Aug. 31, 2020, 3 pages.

(Continued)

*Primary Examiner* — James Keenan
(74) *Attorney, Agent, or Firm* — Foley & Lardner LLP

(57) ABSTRACT

A refuse vehicle includes a chassis, multiple tractive elements, a reach assembly, and a fully-electric lift assembly. The multiple tractive elements are coupled with the chassis and support the refuse vehicle. The reach assembly is coupled with the refuse vehicle. The fully-electric lift assembly is coupled with the reach assembly and includes a track, a carrier assembly, an electric motor, and a drive member. The track includes a straight portion and a curved portion. The track includes multiple channels that extend along an entire length of a path of the track and multiple engagement members. The carrier assembly is configured to move along the path of the track. The electric motor is fixedly coupled with the carrier assembly and drives a driveshaft. The drive member is rotatably fixedly coupled with the driveshaft and engages the multiple engagement members to drive the carrier assembly to ascend or descend along the track.

17 Claims, 16 Drawing Sheets

(58) Field of Classification Search
USPC .......................................................... 414/409
See application file for complete search history.

(56) References Cited

U.S. PATENT DOCUMENTS

| | | |
|---|---|---|
| 4,051,970 A | 10/1977 | Ramsey |
| 4,219,298 A * | 8/1980 | Stragier .................... B65F 3/08 |
| | | 414/409 |
| 4,313,707 A * | 2/1982 | Bingman ................... B65F 3/08 |
| | | 414/409 |
| 4,401,407 A | 8/1983 | Breckenridge |
| 4,461,608 A | 7/1984 | Boda |
| 4,606,695 A | 8/1986 | Lenz |
| 5,158,340 A | 10/1992 | Boda |
| 5,391,039 A | 2/1995 | Holtom |
| 5,505,576 A | 4/1996 | Sizemore et al. |
| 5,702,225 A * | 12/1997 | Ghibaudo .................. B65F 3/08 |
| | | 414/408 |
| 5,720,589 A | 2/1998 | Christenson et al. |
| 5,816,766 A | 10/1998 | Clark |
| 5,833,428 A | 11/1998 | Szinte |
| 5,919,027 A | 7/1999 | Christenson |
| 5,934,858 A | 8/1999 | Christenson |
| 5,934,867 A | 8/1999 | Christenson |
| 5,938,394 A | 8/1999 | Christenson |
| 5,951,235 A | 9/1999 | Young et al. |
| 5,967,731 A | 10/1999 | Brandt |
| 5,971,694 A | 10/1999 | McNeilus et al. |
| 5,984,609 A | 11/1999 | Bartlett |
| 5,988,970 A | 11/1999 | Holtom |
| 6,033,176 A | 3/2000 | Bartlett |
| 6,062,803 A | 5/2000 | Christenson |
| 6,071,058 A * | 6/2000 | Tetz .......................... B65F 3/08 |
| | | 414/409 |
| 6,089,813 A | 7/2000 | McNeilus et al. |
| 6,095,744 A | 8/2000 | Harrison |
| 6,120,235 A | 9/2000 | Humphries et al. |
| 6,123,500 A | 9/2000 | McNeilus et al. |
| 6,135,536 A | 10/2000 | Ciavaglia et al. |
| 6,210,094 B1 | 4/2001 | McNeilus et al. |
| 6,213,706 B1 | 4/2001 | Christenson |
| 6,224,318 B1 | 5/2001 | McNeilus et al. |
| 6,315,515 B1 | 11/2001 | Young et al. |
| 6,336,783 B1 | 1/2002 | Young et al. |
| 6,350,098 B1 | 2/2002 | Christenson et al. |
| 6,390,758 B1 | 5/2002 | McNeilus et al. |
| 6,447,239 B2 | 9/2002 | Young et al. |
| 6,474,928 B1 | 11/2002 | Christenson |
| 6,491,489 B1 * | 12/2002 | Stragier .................... B65F 3/046 |
| | | 414/409 |
| 6,494,665 B1 * | 12/2002 | Bingman ................... B65F 3/08 |
| | | 414/409 |
| 6,520,008 B1 | 2/2003 | Stragier |
| 6,565,305 B2 | 5/2003 | Schrafel |
| 7,070,382 B2 | 7/2006 | Pruteanu et al. |
| 7,073,620 B2 | 7/2006 | Braun et al. |
| 7,198,130 B2 | 4/2007 | Schimke |
| 7,258,194 B2 | 8/2007 | Braun et al. |
| 7,284,943 B2 | 10/2007 | Pruteanu et al. |
| 7,357,203 B2 | 4/2008 | Morrow et al. |
| 7,448,460 B2 | 11/2008 | Morrow et al. |
| 7,556,468 B2 | 7/2009 | Grata |
| 7,559,735 B2 | 7/2009 | Pruteanu et al. |
| 7,824,293 B2 | 11/2010 | Schimke |
| 7,878,750 B2 | 2/2011 | Zhou et al. |
| 7,931,103 B2 | 4/2011 | Morrow et al. |
| 8,123,645 B2 | 2/2012 | Schimke |
| 8,182,194 B2 | 5/2012 | Pruteanu et al. |
| 8,215,892 B2 | 7/2012 | Calliari |
| 8,251,420 B2 | 8/2012 | Mizuno et al. |
| 8,337,352 B2 | 12/2012 | Morrow et al. |
| 8,360,706 B2 | 1/2013 | Addleman et al. |
| 8,540,475 B2 | 9/2013 | Kuriakose et al. |
| 8,561,735 B2 | 10/2013 | Morrow et al. |
| 8,807,613 B2 | 8/2014 | Howell et al. |
| 8,864,613 B2 | 10/2014 | Morrow et al. |
| 9,174,686 B1 | 11/2015 | Messina et al. |
| 9,216,856 B2 | 12/2015 | Howell et al. |
| 9,387,985 B2 | 7/2016 | Gillmore et al. |
| 9,428,042 B2 | 8/2016 | Morrow et al. |
| 9,650,032 B2 | 5/2017 | Kotloski et al. |
| 9,651,120 B2 | 5/2017 | Morrow et al. |
| 9,656,659 B2 | 5/2017 | Shukla et al. |
| 9,707,869 B1 | 7/2017 | Messina et al. |
| 9,834,377 B1 | 12/2017 | Hayes et al. |
| 9,880,581 B2 | 1/2018 | Kuriakose et al. |
| 9,908,520 B2 | 3/2018 | Shukla et al. |
| 9,970,515 B2 | 5/2018 | Morrow et al. |
| 9,981,803 B2 | 5/2018 | Davis et al. |
| 10,029,555 B2 | 7/2018 | Kotloski et al. |
| 10,029,556 B2 | 7/2018 | Morrow et al. |
| 10,160,438 B2 | 12/2018 | Shukla et al. |
| 10,174,868 B2 | 1/2019 | Ditty et al. |
| 10,196,205 B2 | 2/2019 | Betz et al. |
| 10,267,390 B2 | 4/2019 | Morrow et al. |
| 10,301,111 B2 * | 5/2019 | Schell ....................... B65F 3/08 |
| 10,357,995 B2 | 7/2019 | Palmer et al. |
| 10,414,067 B2 | 9/2019 | Datema et al. |
| 10,421,350 B2 | 9/2019 | Morrow et al. |
| 10,435,026 B2 | 10/2019 | Shively et al. |
| 10,457,134 B2 | 10/2019 | Morrow et al. |
| 10,457,533 B2 | 10/2019 | Puszkiewicz et al. |
| 10,558,234 B2 | 2/2020 | Kuriakose et al. |
| 10,578,195 B2 | 3/2020 | Steinberger et al. |
| 10,584,775 B2 | 3/2020 | Steinberger et al. |
| 10,661,986 B2 | 5/2020 | Price et al. |
| 10,865,827 B2 | 12/2020 | Gentry et al. |
| 11,001,440 B2 | 5/2021 | Rocholl et al. |
| 2002/0154973 A1 | 10/2002 | Bradshaw et al. |
| 2006/0280582 A1 | 12/2006 | Kouri |
| 2011/0240777 A1 * | 10/2011 | Johns ........................ B65F 3/00 |
| | | 241/101.71 |
| 2012/0261931 A1 | 10/2012 | Kang |
| 2014/0269145 A1 | 9/2014 | Fasana et al. |
| 2015/0151433 A1 | 6/2015 | Rust et al. |
| 2016/0044285 A1 | 2/2016 | Gasca et al. |
| 2017/0044815 A1 | 2/2017 | Watanabe |
| 2018/0155124 A1 | 6/2018 | Kay et al. |
| 2018/0250847 A1 | 9/2018 | Wurtz et al. |
| 2018/0326832 A1 | 11/2018 | Kotloski et al. |
| 2019/0091890 A1 | 3/2019 | Rocholl et al. |
| 2019/0111910 A1 | 4/2019 | Shukla et al. |
| 2019/0121353 A1 | 4/2019 | Datema et al. |
| 2019/0161272 A1 | 5/2019 | Betz et al. |
| 2019/0193934 A1 | 6/2019 | Rocholl et al. |
| 2019/0242460 A1 | 8/2019 | Morrow et al. |
| 2019/0322321 A1 | 10/2019 | Schwartz et al. |
| 2019/0325220 A1 | 10/2019 | Wildgrube et al. |
| 2019/0344475 A1 | 11/2019 | Datema et al. |
| 2019/0360600 A1 | 11/2019 | Jax et al. |
| 2019/0366828 A1 | 12/2019 | Morrow et al. |
| 2020/0031641 A1 | 1/2020 | Puszkiewicz et al. |
| 2020/0039341 A1 | 2/2020 | Morrow et al. |
| 2020/0078986 A1 | 3/2020 | Clifton et al. |
| 2020/0102145 A1 | 4/2020 | Nelson et al. |
| 2020/0180860 A1 | 6/2020 | Searle et al. |
| 2020/0200237 A1 | 6/2020 | Steinberger et al. |
| 2020/0200238 A1 | 6/2020 | Steinberger et al. |
| 2020/0230841 A1 | 7/2020 | Datema et al. |
| 2020/0230842 A1 | 7/2020 | Datema et al. |
| 2020/0262328 A1 | 8/2020 | Nelson et al. |
| 2020/0262366 A1 | 8/2020 | Wildgrube et al. |
| 2020/0265656 A1 | 8/2020 | Koga et al. |
| 2021/0122568 A1 | 4/2021 | Boivin et al. |

FOREIGN PATENT DOCUMENTS

| | | | |
|---|---|---|---|
| DE | 102006032206 A1 * | 1/2008 | ............... B65F 3/26 |
| DE | 10 2007 026 418 A1 | 12/2008 | |
| GB | 2 405 395 A | 3/2005 | |

(56) References Cited

FOREIGN PATENT DOCUMENTS

JP          2016-068200  A       5/2016
WO       WO-2019033201  A   *   2/2019   ................ B65F 3/08

OTHER PUBLICATIONS

Boivin Evolution, Introducing the First 100% Electric Automated Arm and Collection Body, URL: https://28d16714-b3dd-403e-a844-10d42b38b19e.filesusr.com/ugd/6b1a10_9255a4d94f054fd48e688e6fe30c6874.pdf, printed on Aug. 31, 2020, 2 pages.

* cited by examiner

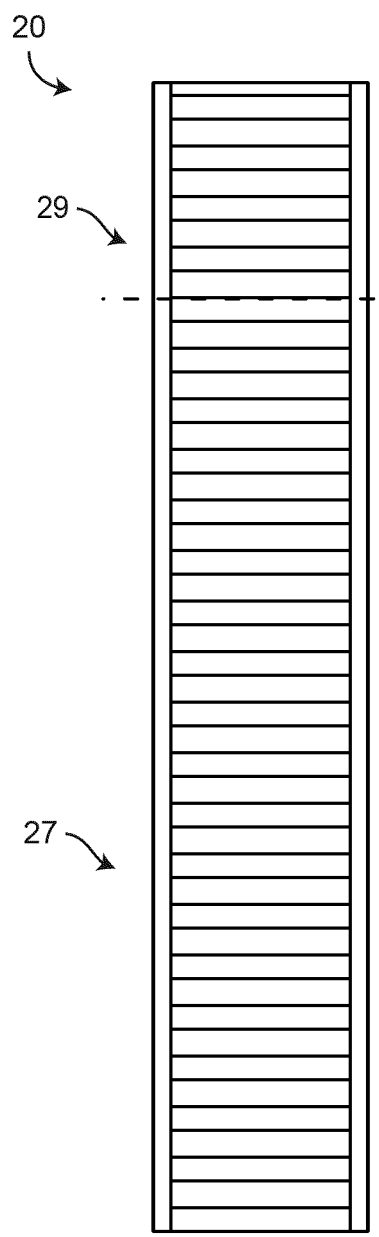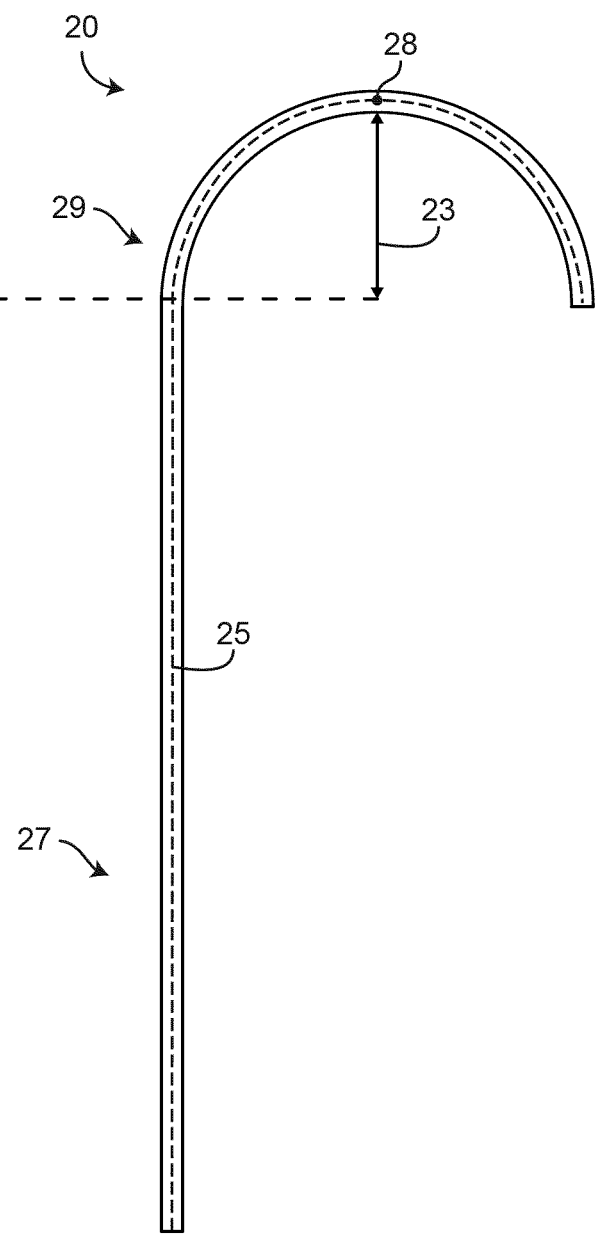
FIG. 4                    FIG. 5

REFUSE VEHICLE WITH ELECTRIC LIFT

CROSS-REFERENCE TO RELATED PATENT APPLICATION

This application claims the benefit of and priority to U.S. Provisional Patent Application No. 62/843,067, filed May 3, 2019, the entire disclosure of which is incorporated by reference herein.

BACKGROUND

The present application generally relates to refuse vehicles. More specifically, the present application relates to lifting apparatuses for refuse vehicles.

SUMMARY

One implementation of the present disclosure is a fully-electric lift assembly for a refuse vehicle, according to an exemplary embodiment. The fully-electric lift assembly includes a track, and a carrier assembly. The track includes a straight portion and a curved portion. The track includes multiple channels that extend along an entire length of a path of the track. The carrier assembly is configured to translate along the path of the track. The carrier assembly includes multiple slidable members, an electric motor, and at least one of a roller pinion, a gear, or a sprocket. Each of the slidable members are configured to slidably couple with the track at a corresponding one of the multiple channels. The electric motor is configured to drive a shaft. The roller pinion is rotatably coupled with the shaft and is configured to engage a rack of the track to drive the carrier to ascend along the track. The gear is rotatably coupled with the shaft and configured to engage multiple rungs of the track to drive the carrier to ascend along the track. The is sprocket rotatably coupled with the shaft and is configured to engage a fixed chain that extends along the track to drive the carrier to ascend along the track.

Another implementation of the present disclosure is a fully-electric lift assembly for a refuse vehicle, according to an exemplary embodiment. The fully-electric lift assembly includes a track, a carrier, and a push chain. The track includes a straight portion and a curved portion. The track includes multiple channels that extend along an entire length of a path of the track. The carrier is configured to translate along the path of the track. The carrier includes multiple slidable members, each slidable member configured to engage the track at a corresponding one of the multiple channels. The push chain is configured to couple with the carrier at a first end and be driven by an electric motor. The push chain is configured to exert a pushing force on the carrier to drive the carrier to ascend along the track.

Another implementation of the present disclosure is a refuse vehicle, according to an exemplary embodiment. The refuse vehicle includes a chassis, multiple tractive elements, a reach assembly, and a fully-electric lift assembly. The multiple tractive elements are coupled with the chassis and configured to support the refuse vehicle. The reach assembly is coupled with the refuse vehicle. The fully-electric lift assembly is coupled with the reach assembly and includes a track, a carrier assembly, an electric motor, and a drive member. The track includes a straight portion and a curved portion. The track includes multiple channels that extend along an entire length of a path of the track and multiple engagement members. The carrier assembly is configured to move along the path of the track. The electric motor is fixedly coupled with the carrier assembly and configured to drive a driveshaft. The drive member is rotatably fixedly coupled with the driveshaft and configured to engage the multiple engagement members to drive the carrier assembly to ascend or descend along the track.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which:

FIG. 4 is a front view of the track of FIG. 1, according to an exemplary embodiment;

FIG. 5 is a side view of the track of FIG. 1, according to an exemplary embodiment;

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the FIGURES, various embodiments of a fully-electric lifting apparatus, system, or assembly for a refuse vehicle are shown. The fully-electric lifting apparatus can include a track, a carrier, and a grabber assembly coupled to the carrier. The carrier is configured to travel along (e.g., ascend or descend) the track to lift and empty refuse containers in a refuse vehicle compartment. The track can include a straight lower portion and a curved upper portion. The track can include an interfacing member that extends along an entire length of a path of the track. The interfacing member can be any of a rack including teeth, rungs (e.g., cylindrical or tubular members that are spaced apart and extend between support rails of the track along the entire length of the track), or a stationary chain. The carrier can include electric motors fixedly coupled with the carrier and configured to drive a shaft. The shaft can include a rolling member (e.g., a sprocket, a roller pinion, a gear, a toothed member, etc.) configured to engage the interfacing member of the track. The electric motors can drive the rolling member to cause the carrier and the grabber assembly to ascend or descend along the track.

The track can include a storage apparatus at a bottom end of the track. The storage apparatus can include a pivotal bottom portion of the track that the carrier can translate down to. The pivotal bottom portion can be driven to pivot or rotate inwards and can engage a hook to releasably secure the carrier and the grabber assembly. The storage apparatus facilitates safe storage of the carrier and the grabber assembly during transportation.

The track can include an upper portion and a lower portion that can translate relative to each other. The upper portion can be fixedly coupled with the refuse vehicle. The lower portion can be coupled to a reach assembly that couples to the refuse vehicle. The reach assembly can include a telescoping member (or multiple telescoping members) that are driven to extend or retract by one or more electric motors. When the reach assembly is driven to extend, the lower portion translates relative to the upper portion, which remains stationary. The reach assembly can then be retracted to a position such that the upper and lower portion of the track are aligned. When the upper and lower portion of the track are aligned, the carrier and the grabber assembly can be driven to ascend or descend along the track to lift and empty refuse containers.

Figure 1:
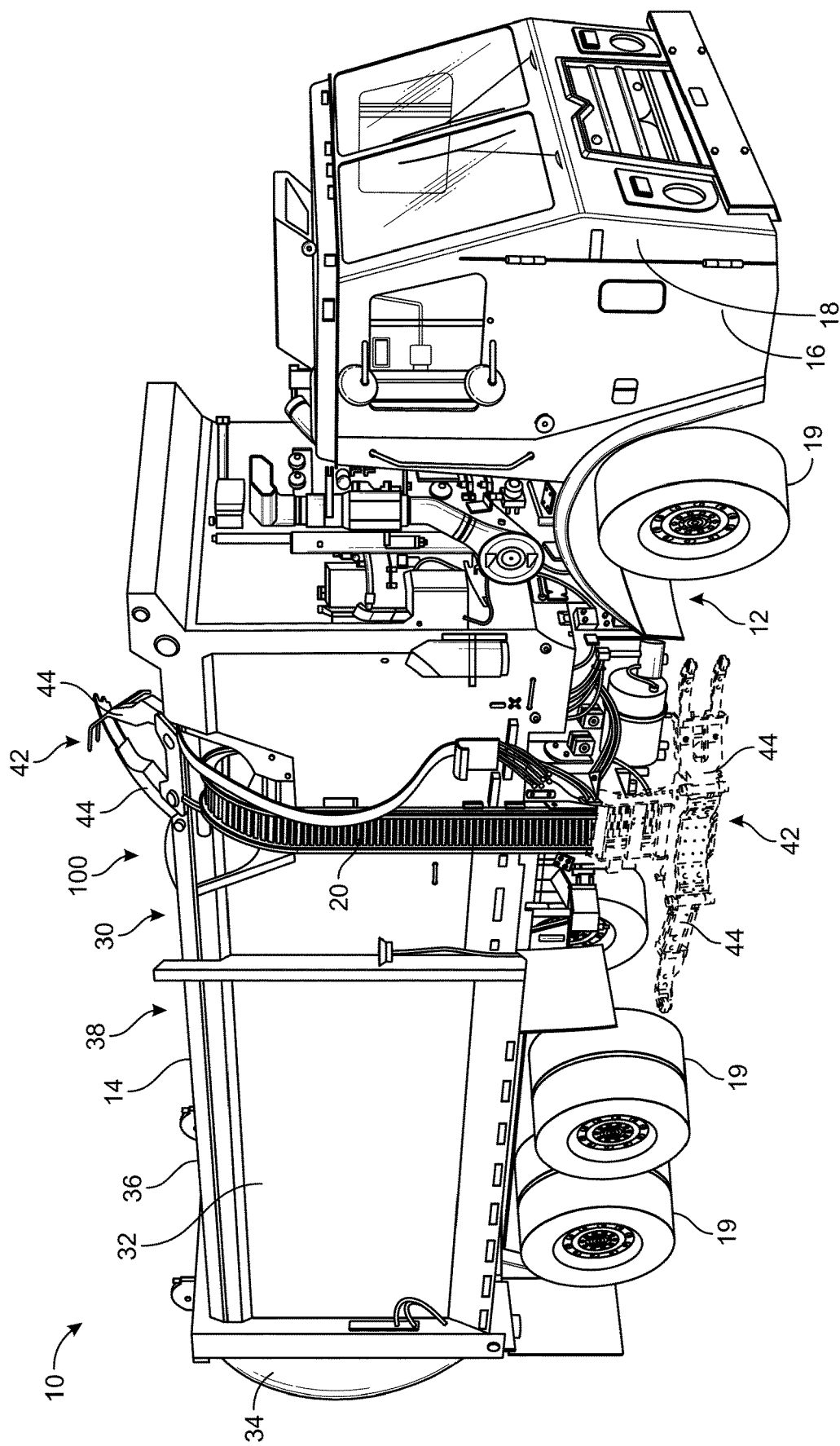
FIG. 1 is a perspective view of a refuse vehicle, shown to include a loading assembly, a track, and a grabber assembly, according to an exemplary embodiment.

According to the exemplary embodiment shown in FIG. 1, a vehicle, shown as refuse vehicle 10 (e.g., a garbage truck, a waste collection truck, a sanitation truck, a refuse collection truck, a refuse collection vehicle, etc.), is configured as a side-loading refuse truck having a first lift mechanism/system (e.g., a side-loading lift assembly, etc.), shown as lift assembly 100. In other embodiments, refuse vehicle 10 is configured as a front-loading refuse truck or a rear-loading refuse truck. In still other embodiments, the vehicle is another type of vehicle (e.g., a skid-loader, a telehandler, a plow truck, a boom lift, etc.).

As shown in FIG. 1, refuse vehicle 10 includes a chassis, shown as frame 12; a body assembly, shown as body 14, coupled to frame 12 (e.g., at a rear end thereof, etc.); and a cab, shown as cab 16, coupled to frame 12 (e.g., at a front end thereof, etc.). Cab 16 may include various components to facilitate operation of refuse vehicle 10 by an operator (e.g., a seat, a steering wheel, hydraulic controls, a user interface, switches, buttons, dials, etc.). As shown in FIG. 1, refuse vehicle 10 includes a prime mover, shown as engine 18, coupled to frame 12 at a position beneath cab 16. Engine 18 is configured to provide power to a plurality of tractive elements, shown as wheels 19, and/or to other systems of refuse vehicle 10 (e.g., a pneumatic system, a hydraulic system, an electric system, etc.). Engine 18 may be configured to utilize one or more of a variety of fuels (e.g., gasoline, diesel, bio-diesel, ethanol, natural gas, etc.), according to various exemplary embodiments. According to an alternative embodiment, engine 18 additionally or alternatively includes one or more electric motors coupled to frame 12 (e.g., a hybrid refuse vehicle, an electric refuse vehicle, etc.). The electric motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to the systems of refuse vehicle 10.

According to an exemplary embodiment, refuse vehicle 10 is configured to transport refuse from various waste receptacles within a municipality to a storage and/or processing facility (e.g., a landfill, an incineration facility, a recycling facility, etc.). As shown in FIG. 1, body 14 includes a plurality of panels, shown as panels 32, a tailgate 34, and a cover 36. Panels 32, tailgate 34, and cover 36 define a collection chamber (e.g., hopper, etc.), shown as refuse compartment 30. Loose refuse may be placed into refuse compartment 30 where it may thereafter be compacted. Refuse compartment 30 may provide temporary storage for refuse during transport to a waste disposal site and/or a recycling facility. In some embodiments, at least a portion of body 14 and refuse compartment 30 extend in front of cab 16. According to the embodiment shown in FIG. 1, body 14 and refuse compartment 30 are positioned behind cab 16. In some embodiments, refuse compartment 30 includes a hopper volume and a storage volume. Refuse may be initially loaded into the hopper volume and thereafter compacted into the storage volume. According to an exemplary embodiment, the hopper volume is positioned between the storage volume and cab 16 (i.e., refuse is loaded into a position of refuse compartment 30 behind cab 16 and stored in a position further toward the rear of refuse compartment 30). In other embodiments, the storage volume is positioned between the hopper volume and cab 16 (e.g., a rear-loading refuse vehicle, etc.).

As shown in FIG. 1, refuse vehicle 10 includes first lift mechanism/system (e.g., a front-loading lift assembly, etc.), shown as lift assembly 100. Lift assembly 100 includes a grabber assembly, a carrier assembly, etc., shown as grabber assembly 42, movably coupled to a track, shown as track 20, and configured to move along an entire length of track 20. According to the exemplary embodiment shown in FIG. 1, track 20 extends along substantially an entire height of body 14 and is configured to cause grabber assembly 42 to tilt near an upper height of body 14. In other embodiments, track 20 extends along substantially an entire height of body 14 on a rear side of body 14. Refuse vehicle 10 can also include a reach system or assembly coupled with a body or frame of refuse vehicle 10 and lift assembly 100. The reach system can include telescoping members, a scissors stack, etc., or any other configuration that can extend or retract to provide additional reach of grabber assembly 42 for refuse collection.

Figure 3:
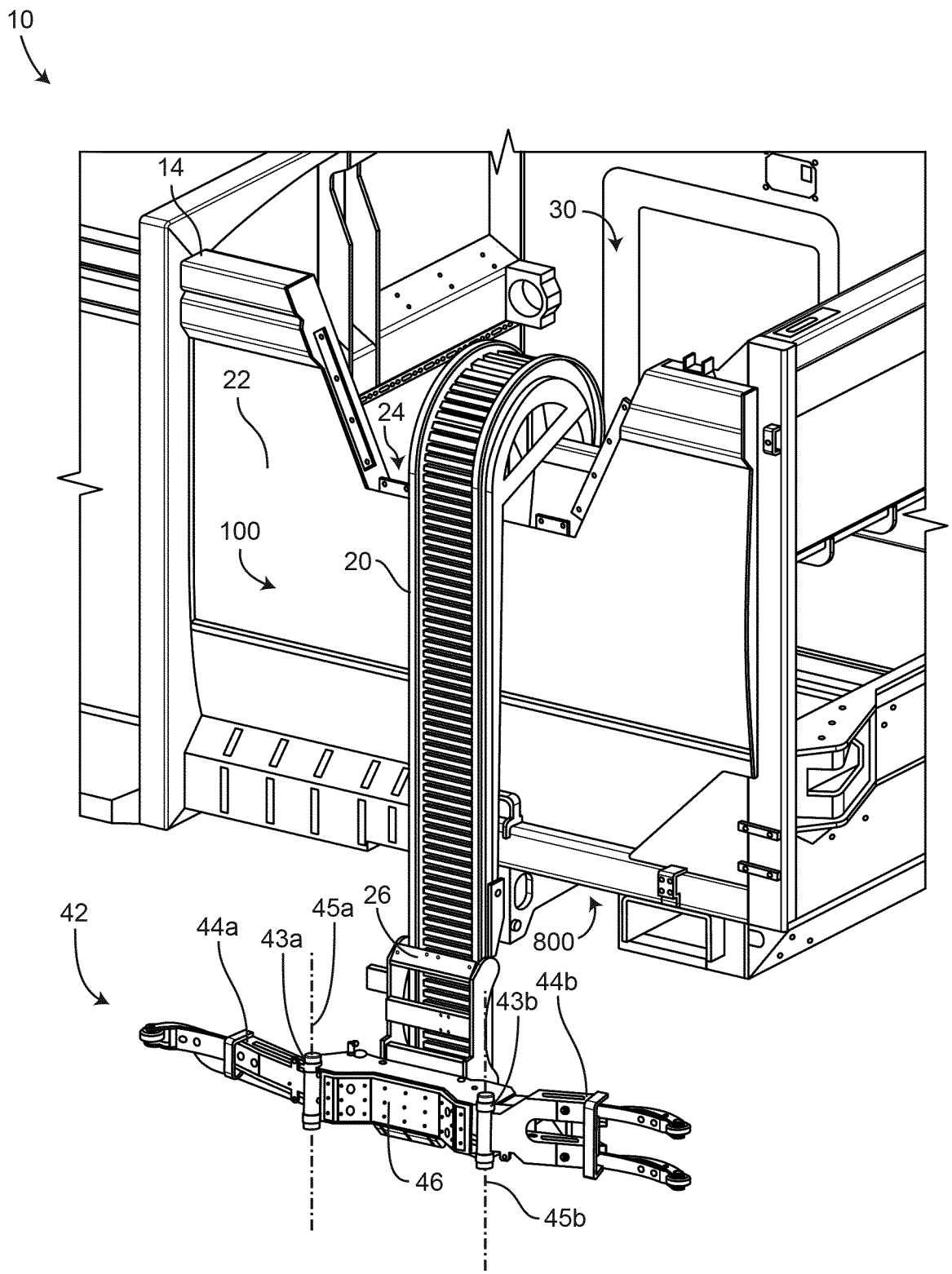
FIG. 3 is a perspective view of the loading assembly of the refuse vehicle of FIG. 1, shown to include the grabber assembly of FIG. 1, according to an exemplary embodiment.

Referring still to FIG. 1, grabber assembly 42 includes a pair of grabber arms shown as grabber arms 44. Grabber arms 44 are configured to rotate about an axis extending through a bushing. Grabber arms 44 are configured to releasably secure a refuse container to grabber assembly 42, according to an exemplary embodiment. Grabber arms 44 rotate about the axis extending through the bushing to transition between an engaged state (e.g., a fully grasped configuration, a fully grasped state, a partially grasped configuration, a partially grasped state) and a disengaged state (e.g., a fully open state/configuration, a fully released state/configuration, a partially open state/configuration, a partially released state/configuration). In the engaged state, grabber arms 44 are rotated towards each other such that the refuse container is grasped therebetween. In the disengaged state, grabber arms 44 rotate outwards (as shown in FIG. 3) such that the refuse container is not grasped therebetween. By transitioning between the engaged state and the disengaged state, grabber assembly 42 releasably couples the refuse container with grabber assembly 42. Refuse vehicle 10 may pull up along-side the refuse container, such that the refuse container is positioned to be grasped by the grabber assembly 42 therebetween. Grabber assembly 42 may then transition into an engaged state to grasp the refuse container. After the refuse container has been securely grasped, grabber assembly 42 may be transported along track 20 with the refuse container. When grabber assembly 42 reaches the end of track 20, grabber assembly 42 may tilt and empty the contents of the refuse container in refuse compartment 30. The tilting is facilitated by the path of track 20. When the contents of the refuse container have been emptied into refuse compartment 30, grabber assembly 42 may descend along track 20, and return the refuse container to the ground. Once the refuse container has been placed on the ground, the grabber assembly may transition into the disengaged state, releasing the refuse container.

Figure 2:
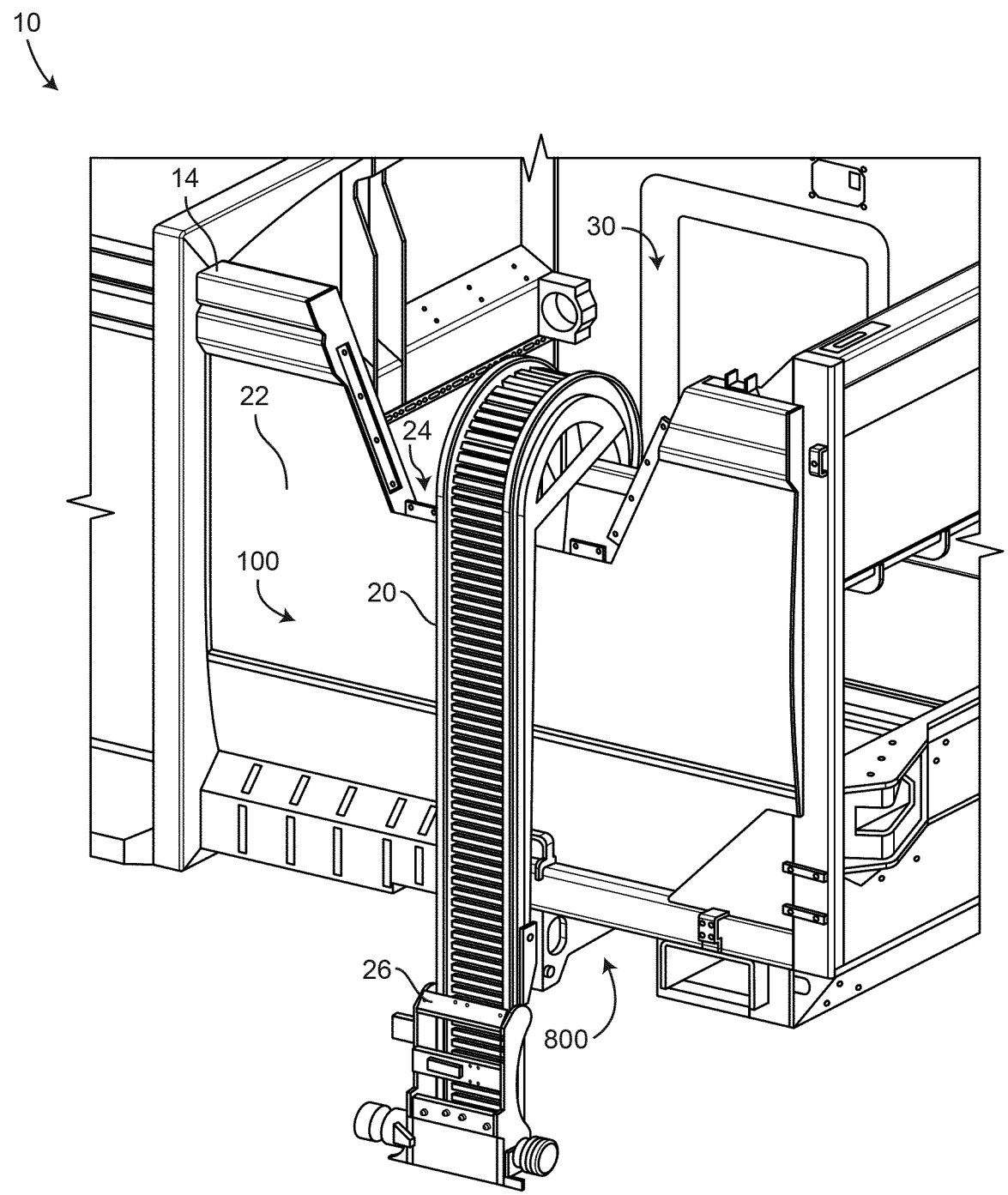
FIG. 2 is a perspective view of the loading assembly of the refuse vehicle of FIG. 1, according to an exemplary embodiment.

Referring now to FIGS. 2-3, the lift assembly 100 is shown in greater detail, according to an exemplary embodiment. Lift assembly 100 is shown to include track 20, and a coupling member, shown as carrier 26. Track 20 is configured to extend along substantially the entire height of body 14, according to the exemplary embodiment shown. Body 14 is shown to include a loading section, shown as loading section 22. Loading section 22 is shown to include a recessed portion, shown as recessed portion 24. Recessed portion 24 is configured to allow track 20 to curve through recessed portion 24, such that track 20 may be configured to empty a refuse bin (e.g., a garbage can) releasably couple to grabber assembly 42 in refuse compartment 30.

Still referring to FIGS. 2-3, carrier 26 is shown coupled with track 20. Carrier 26 is coupled to track 20 such that carrier 26 may move along an entire path length of track 20. Carrier 26 may removably couple with grabber assembly 42, thereby removably coupling grabber assembly 42 to track 20, and allowing grabber assembly 42 to travel along the entire path length of track 20. Carrier 26 removably couples (e.g., by removable fasteners) to a carriage portion of grabber assembly 42, shown as carriage 46. Grabber assembly 42 is shown to include grabber arms, shown as first grabber arm 44a and second grabber arm 44b, according to an exemplary embodiment. First grabber arm 44a and second grabber arm 44b are each configured to pivot about 45a and axis 45b, respectively. Axis 45a is defined as an axis longitudinally extending through substantially an entire length of a first adapter or bushing assembly, shown as first adapter assembly 43a, and axis 45b is defined as an axis longitudinally extending through substantially an entire length of a second adapter or bushing assembly, shown as second adapter assembly 43b. First adapter assembly 43a fixedly couples to a first end of carriage 46, and rotatably couples to first grabber arm 44a. Second adapter assembly 43b fixedly couples to a second end of carriage 46, and rotatably couples to second grabber arm 44b. First adapter assembly 43a and second adapter assembly 43b couple first grabber arm 44a and second grabber arm 44b to carriage 46, and allow first grabber arm 44a and second grabber arm 44b to rotate about axis 45a and axis 45b, respectively.

Referring now to FIGS. 4-5, the track 20 is shown in greater detail according to an exemplary embodiment. FIG. 4 shows a front view of track 20, and FIG. 5 shows a side view of track 20, according to an exemplary embodiment. Track 20 is shown to include a straight portion 27, and a curved portion 29. Straight portion 27 may be substantially vertical, and/or substantially parallel to loading section 22 of body 14, according to an exemplary embodiment. Curved portion 29 may have a radius of curvature, shown as radius 23, according to an exemplary embodiment. In some embodiments, curved portion 29 has a constant radius of curvature (i.e., curved portion 29 has a constant radius 23 along all points on a path of curved portion 29), while in other embodiments, curved portion 29 has a non-constant radius of curvature (i.e., curved portion 29 has a non-constant radius 23 along various points on the path of curved portion 29). According to an exemplary embodiment, straight portion 27 has an infinite radius of curvature. According to an exemplary embodiment, grabber assembly 42 may travel along a path of track 20, shown as path 25. Track 20 may be configured to tilt grabber assembly 42 to empty contents of a refuse container when grabber assembly 42 travels along path 25 and travels past a point on path 25, shown as point 28. When grabber assembly 42 travels along path 25 past point 28, grabber assembly 42 may tilt, emptying the contents of the refuse container in refuse compartment 30.

Figure 6:
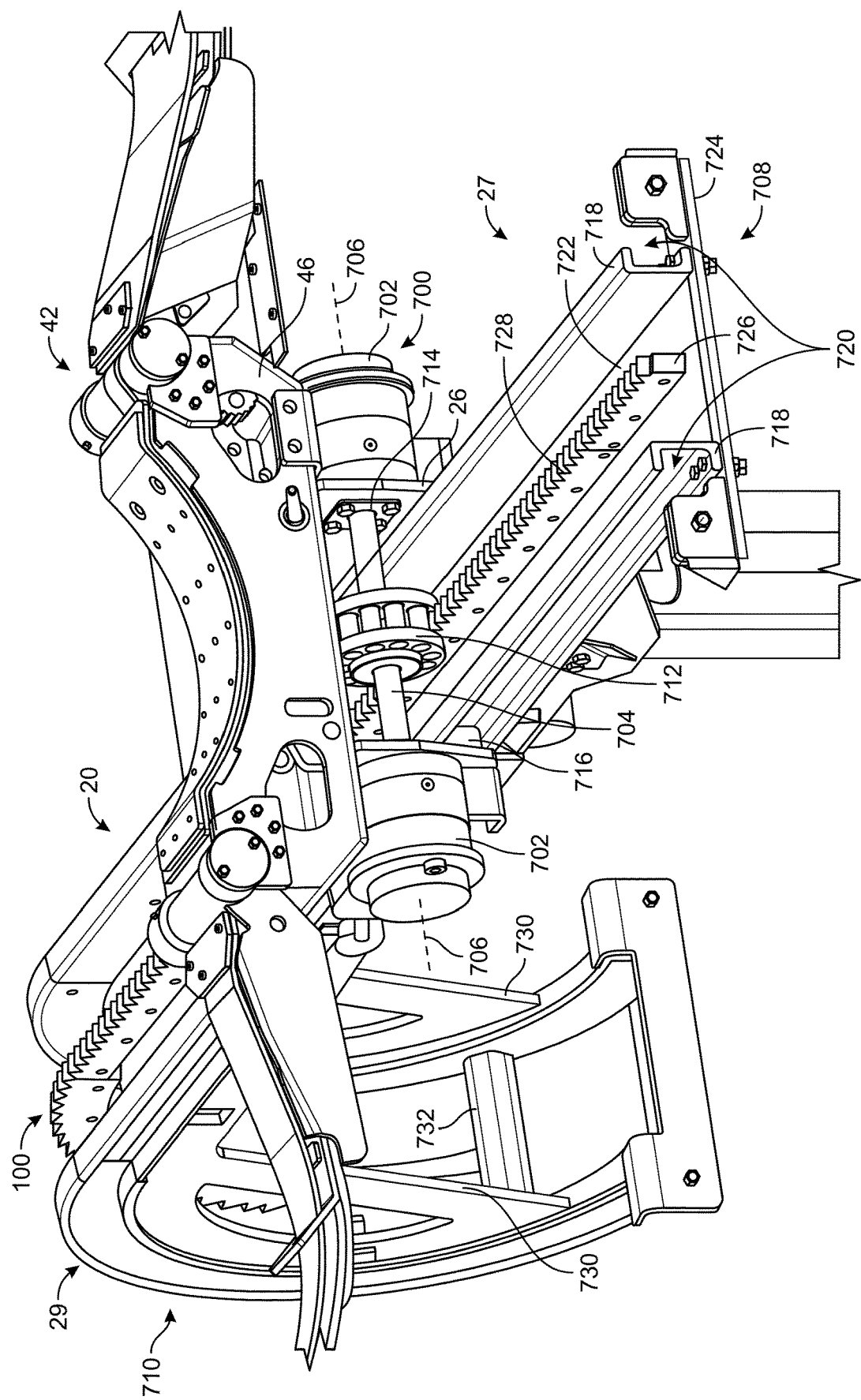
FIG. 6 is a perspective view of an electric lift assembly that can be used on the refuse vehicle of FIG. 1, according to an exemplary embodiment.

Referring now to FIG. 6, an electric lift system 700 is configured to drive grabber assembly 42 to translate along track 20. Electric lift system 700 includes electric motors 702 disposed at opposite lateral sides of carrier 26. Carrier 26 is configured to translate along straight portion 27 and curved portion 29 of track 20 to lift and dump contents of a refuse bin grasped by grabber assembly 42 or releasably secured with grabber assembly 42. As described hereinabove, carriage 46 can be removably or fixedly coupled (e.g., integrally formed) with carrier 26 so that carriage 46 translates along track 20 with carrier 26.

Electric motors 702 can be mounted or fixedly coupled with carrier 26. Electric motors 702 can each include a gearbox, a brake, and an output driveshaft. In some embodiments, the output driveshaft of each of electric motors 702 are coupled, shown as driveshaft 704. Electric motors 702 are configured to drive/rotate driveshaft 704 to translate carrier 26 and grabber assembly 42 upwards along track 20. Electric motors 702 can cooperatively drive driveshaft 704 to translate carrier 26 along track 20. In some embodiments, electric motors 702 can be operated to drive/rotate driveshaft 704 in a first direction (e.g., counter-clockwise about axis 706) to translate carrier 26 and grabber assembly 42 upwards along track 20 and in a second direction (e.g., clockwise about axis 706) to translate carrier 26 and grabber assembly 42 downwards along track 20. In this way, electric motors 702 can be operated in either direction to translate carrier 26 and grabber assembly 42 upwards or downwards along track 20.

Electric motors 702 can be mounted to exterior surfaces or portions of carrier 26. Electric motors 702 can be substantially parallel to each other and are configured to exert a torque on driveshaft 704 about a common or shared axis, shown as axis 706. Track 20 includes a support portion, a generally flat member, a plate, etc., shown as web portion 722. Track 20 also includes side portions, side members, structural members, I-beams, U-beams, etc., shown as rails 718. Rails 718 are positioned at opposite sides of web portion 722. Rails 718 and web portion 722 can be integrally formed, fixedly coupled (e.g., welded), removably coupled (e.g., with fasteners), etc. In some embodiments, rails 718 extend along substantially the entire path of track 20. Rails 718 can extend from web portion 722 in a direction perpendicular to web portion 722. In some embodiments, rails 718 and web portion 722 are removably coupled with a member, a structural member, a connection member, a coupling member, etc., shown as coupling member 724. Coupling member 724 can facilitate removable coupling therebetween web portion 722 and rails 718.

Rails 718 each include a channel, a recess, a groove, a slot, a track, a recession, a continuous channel, etc., shown as channels 720. In some embodiments, channels 720 are defined by a cross-sectional shape of rails 718. Channels 720 extend along substantially the entire path length of rails 718 and track 20.

Channels 720 are configured to each receive and slidably couple with a protrusion, a linear bearing, a roller, a guide portion, a post, a cylindrical member, a block, etc., shown as linear bearing members 716. Linear bearing members 716 can extend inwards from carrier 26 and can be received by and slidably couple with rails 718. Linear bearing members 716 may be received therewithin channels 720 and slidably couple with one or more surfaces of channels 720. Linear bearing members 716 can translate along channels 720 as carrier 26 and grabber assembly 42 are translated along track 20. Linear bearing members 716 facilitate alignment between carrier 26 and track 20. Linear bearing members 716 also support carrier 26 with track 20 such that carrier 26 and grabber assembly 42 translate along the path of track 20.

Electric motors 702 can be operated by a controller to lift and dump refuse collection bins (e.g., garbage cans) grasped by grabber assembly 42. Grabber assembly 42 and carrier 26 can be translated along track 20 from a bottom end 708 of track 20 to an upper end 710 of track 20. Bottom end 708 of track 20 is a bottom end of straight portion 27. Likewise, upper end 710 of track 20 is an upper end of curved portion 29.

Electric motors 702 can be operated to translate carrier 26 and grabber assembly 42 to bottom end 708 of track 20. When carrier 26 and grabber assembly 42 are at bottom end 708 of track 20, grabber assembly 42 can be operated to a fully opened position/configuration. Grabber assembly 42 can then be operated to a fully or partially grasped configuration to removably couple a refuse collection bin with grabber assembly 42. Electric motors 702 can then be operated to translate grabber assembly 42 (and the removably coupled refuse collection bin/container) and carrier 26 upwards along track 20 to lift the refuse collection bin/container and dump the contents of the refuse collection bin/container. Electric motors 702 can then be operated (to exert a torque on driveshaft 704 in an opposite direction) to translate carrier 26 and grabber assembly 42 back to the bottom end 708 of track 20. Grabber assembly 42 can then be operated to release the refuse container. In this way, grabber assembly 42 and electric motors 702 facilitate removably coupling, lifting, and dumping of refuse containers.

Driveshaft 704 can extend therebetween electric motors 702 and can be fixedly coupled with carrier 26. In some embodiments, driveshaft 704 extends through and is supports carrier 26. Driveshaft 704 can be coupled with carrier 26 through bearings 714. Driveshaft 704 can be rotatably coupled with bearings 714 at opposite portions and is free to rotate relative to carrier 26 to drive carrier 26 and grabber assembly 42 to translate along track 20. Bearings 714 can be any ball bearings, roller bearings, etc., that provide sufficient radial loading capabilities (e.g., bearing load capabilities) to support carrier 26 and grabber assembly 42.

Driveshaft 704 includes a drive member, a gear, a rolling member, a roller member, a roller pinion, a rotatable drive member, etc., shown as roller pinion 712. Roller pinion 712 is rotatably coupled with driveshaft 704. Roller pinion 712 can be removably and rotatably coupled with driveshaft 704. In some embodiments, roller pinion 712 is removably coupled with driveshaft 704 through fasteners, keys, etc. In some embodiments, roller pinion 712 is press fit on driveshaft 704. In some embodiments, driveshaft 704 is two shafts that extend from electric motors 702 and are removably and rotatably coupled at their ends with roller pinion 712.

Roller pinion 712 is configured to rotate about axis 706 with rotation of driveshaft 704. In some embodiments, roller pinion 712 is configured to driven by driveshaft 704. Roller pinion 712 can transfer torque exerted on driveshaft 704 by electric motors 702 to translate carrier 26 and grabber assembly 42 along track 20 (e.g., in either direction).

Track 20 includes a rack, a roller rack, a toothed elongated member, an elongated member, a rack, etc., shown as roller rack 726. Roller rack 726 includes teeth 728 (e.g., a plurality of engagement members) configured to mesh with or engage corresponding teeth, posts, members, etc., of roller pinion 712. Teeth 728 and roller rack 726 can extend along the entire length of track 20. In some embodiments, roller rack 726 has a same overall shape as track 20 (e.g., a candy-cane shape, a J-shape, a straight portion and a curved portion, a generally straight portion and an arcuate portion, etc.). Roller rack 727 can be centrally positioned therebetween rails 718. In some embodiments, roller rack 727 is defined by one or more portions that include teeth 728.

Roller rack 726 can be fixedly coupled with web portion 722. In other embodiments, roller rack 726 is removably coupled (e.g., with fasteners) with web portion 722. The meshed coupling between teeth 728 of roller rack 726 and roller pinion 712 facilitates transferring the torque from driveshaft 704 and roller pinion 712 into lift force. The lift force is transferred to carrier 26 and grabber assembly 42 relative to track 20, thereby causing carrier 26 and grabber assembly 42 to translate along track 20. Advantageously, the meshed coupling between teeth 728 of roller rack 726 and roller pinion 712 facilitates lash control. Furthermore, the meshed coupling therebetween roller rack 726 and roller pinion 712 used to lift and translate carrier 26 and grabber assembly 42 facilitates improved efficiency (e.g., an improved efficiency of transferring mechanical energy from electric motors 702 to the lifting force). Advantageously, using roller rack 726 can facilitate faster speeds at which carrier 26 and grabber assembly 42 ascend and descend track 20. Roller rack 726 can also provide a longer life time and a more durable lifting assembly compared to other lifting assemblies.

Track 20 can include structural support members 730. Structural support members 730 extend therebetween neighboring or distal portions of curved portion 29 of track 20. Structural support members 730 can improve the structural strength and load bearing capabilities of track 20. Specifically, structural support members 730 can facilitate additional structural strength when carrier 26 and grabber assembly 42 are at curved portion 29 of track 20. Track 20 can also include a laterally extending structural support member 732. In some embodiments, laterally extending structural support member 732 extends therebetween rails 718 along at least a portion of curved portion 29 of track 20. Laterally extending structural support member 732 can function similarly to web portion 722. Laterally extending structural support member 732 facilitates structural strength and load bearing capabilities of track 20 at curved portion 29.

Figure 8:
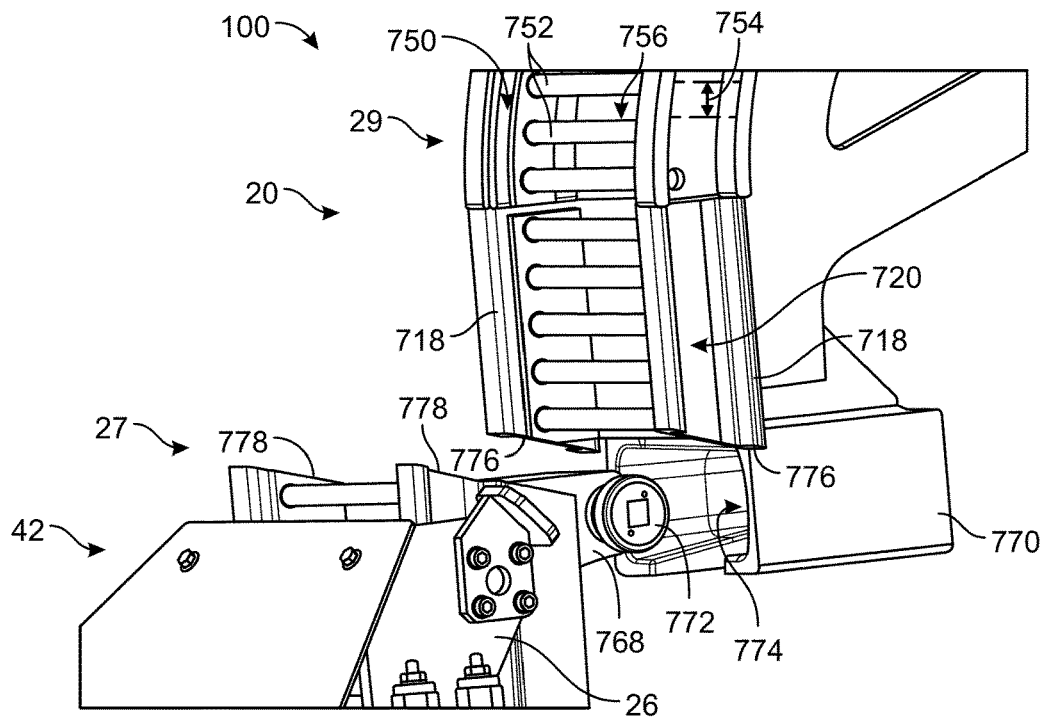
FIG. 8 is a perspective view of an electric lift assembly with a split ladder, according to an exemplary embodiment.
Figure 11:
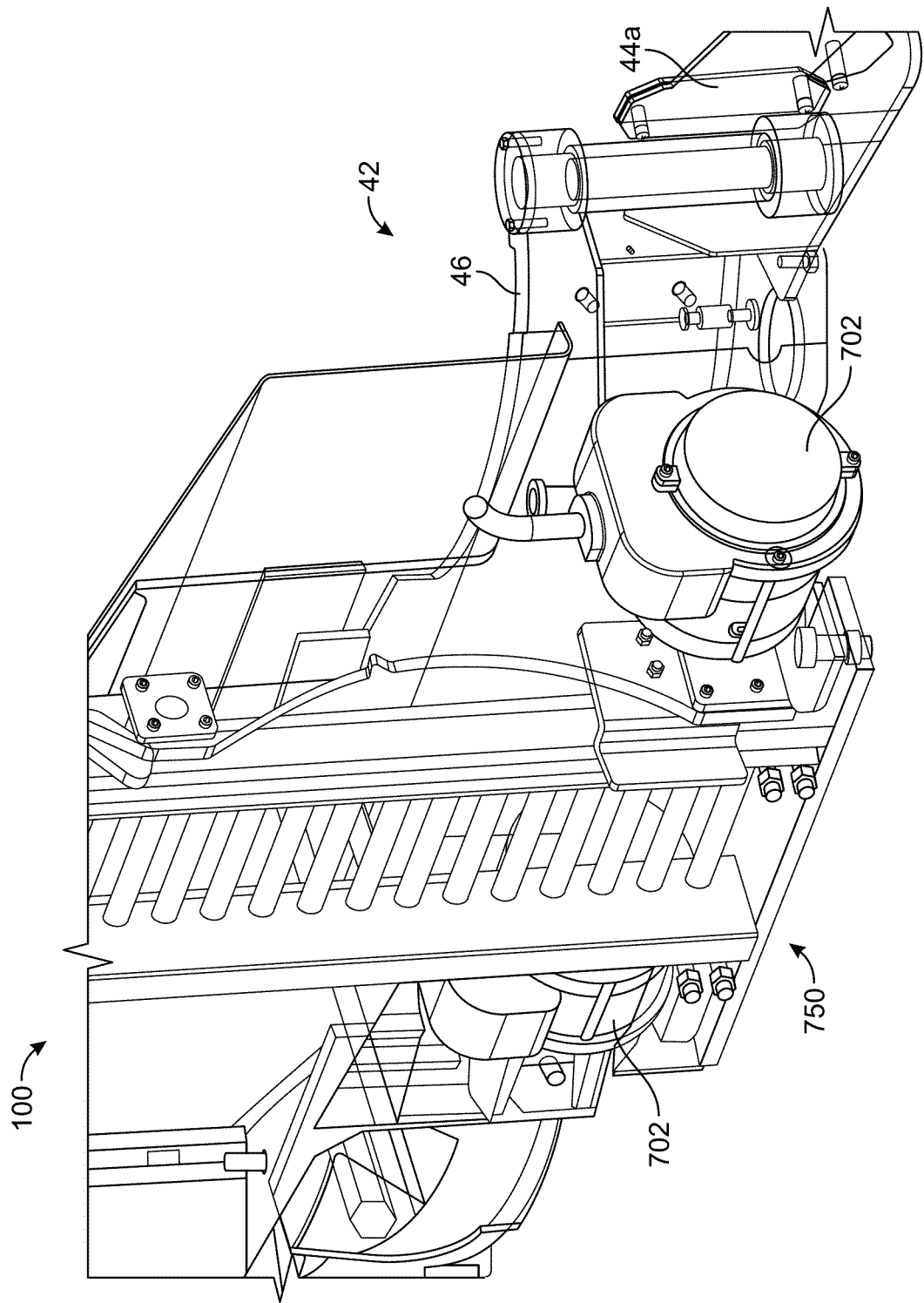
FIG. 11 is a perspective view of an electric lift assembly for a refuse vehicle with a ladder assembly, according to an exemplary embodiment.
Figure 12:
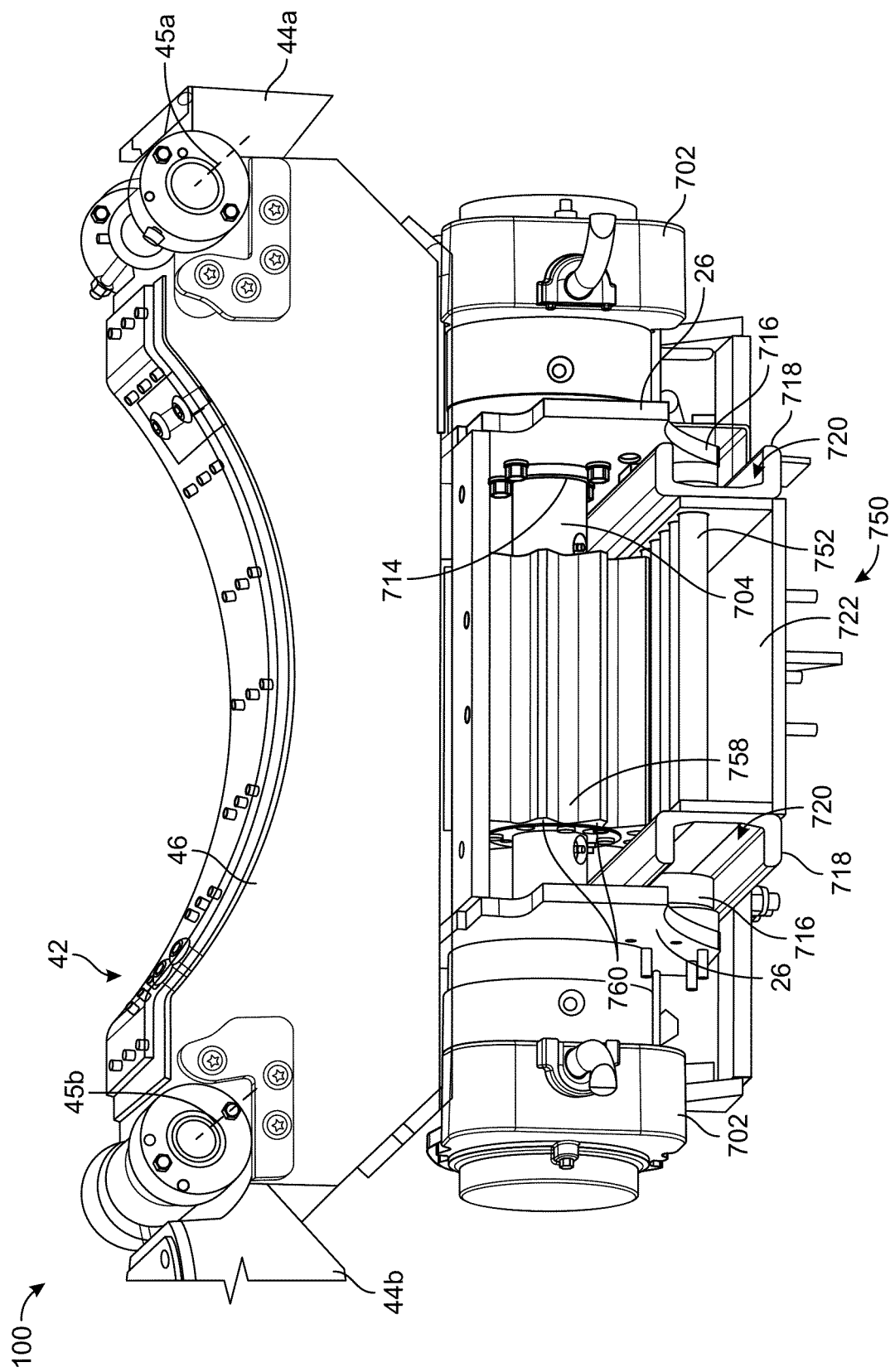
FIG. 12 is a perspective view of the electric lift assembly of FIG. 11, according to an exemplary embodiment.
Figure 13:
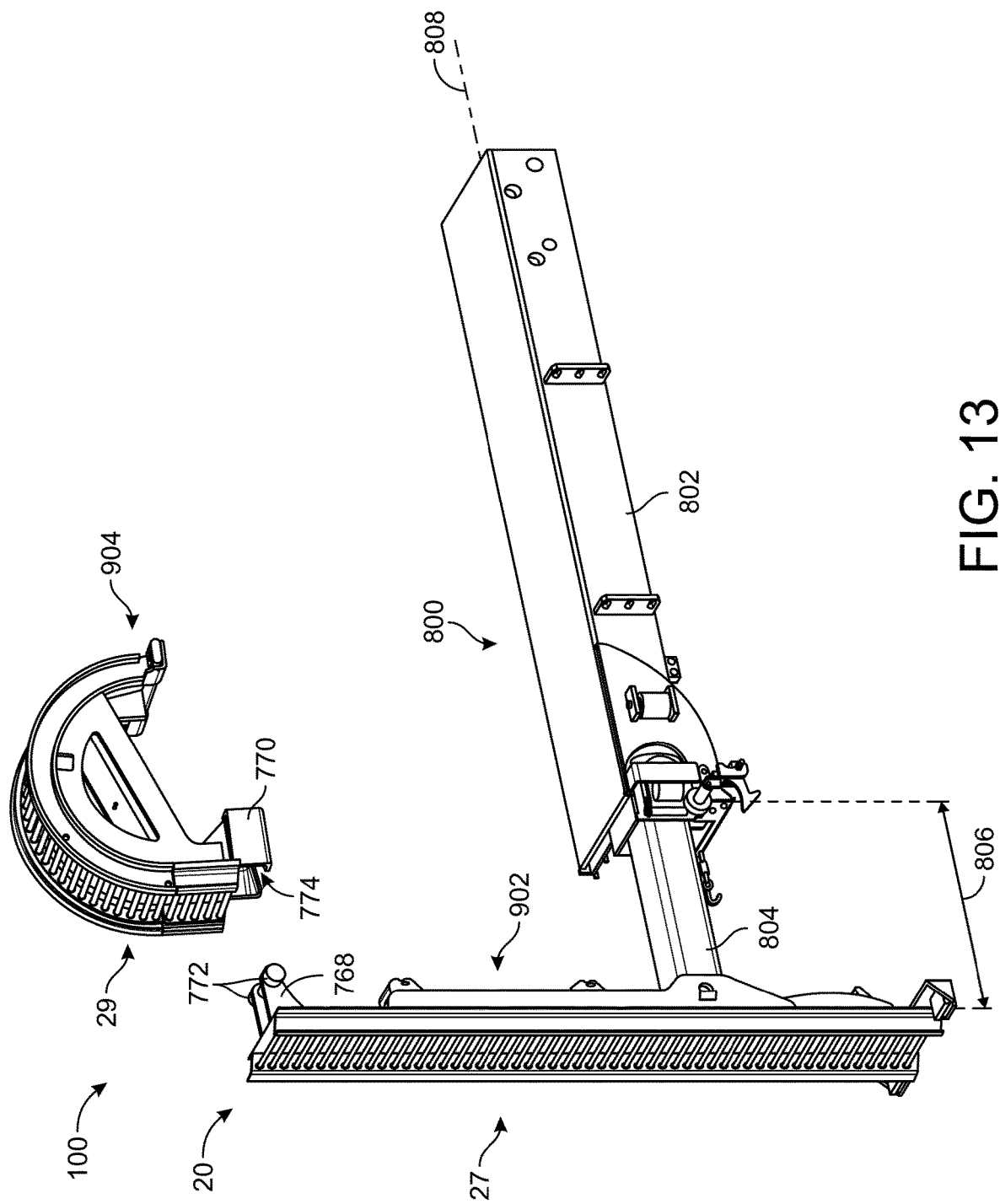
FIG. 13 is a perspective view of the electric lift assembly of FIG. 8, according to an exemplary embodiment.

Referring now to FIGS. 8, 11, and 12, track 20 can include a ladder assembly 750 configured to mesh with a gear, a roller, a pinion, a drive member, a rotatable drive member, a sprocket, etc., shown as sprocket 758. Sprocket 758 can be used in place of roller pinion 712 and may be mounted (e.g., rotatably coupled with) driveshaft 704. Sprocket 758 can be mounted or coupled with driveshaft 704 similarly to roller pinion 712 (e.g., with keys, a press-fit, etc.). Ladder assembly 750 extends along substantially the entire length of track 20. Ladder assembly 750 includes rungs, ladder members, elongated members, cylindrical members, engagement members, etc., shown as rungs 752. Rungs 752 are spaced a distance 754 apart along the path of track 20. Rungs 752 can be spaced apart distance 754 along substantially the entirety of the path of track 20. Adjacent (or consecutive) rungs 752 define a space 756 therebetween. Space 756 is configured to receive teeth, radially extending protrusions, etc., shown as teeth 760 of sprocket 758 to mesh ladder assembly 750 with sprocket 758. As sprocket 758 is driven to rotate (e.g., by electric motors 702), teeth 760 exert a pushing or lifting force to rungs 752 to lift carrier 26 and grabber assembly 42 along track 20. In other embodiments, carrier 26 and grabber assembly 42 are pulled or pushed along track 20 and the gear can freely rotate due to the coupling therebetween teeth 760 of sprocket 758 and ladder assembly 750 and motion of carrier 26 and grabber assembly 42.

Electric motors 702 can each include a gearbox configured to increase torque output such that a sufficient torque is provided to driveshaft 704 to lift or drive carrier 26 and grabber assembly 42 along track 20. Electric motors 702 can also each include a brake that can activate to lock a current angular position of driveshaft 704. In some embodiments, the brake is activated in response to receiving control signals from a controller. The brakes can be activated to lock carrier 26 and grabber assembly 42 at a current position along track 20. In some embodiments, the brakes can be activated when refuse vehicle 10 is shut down, or when lift assembly 100 is powered off.

Figure 7:
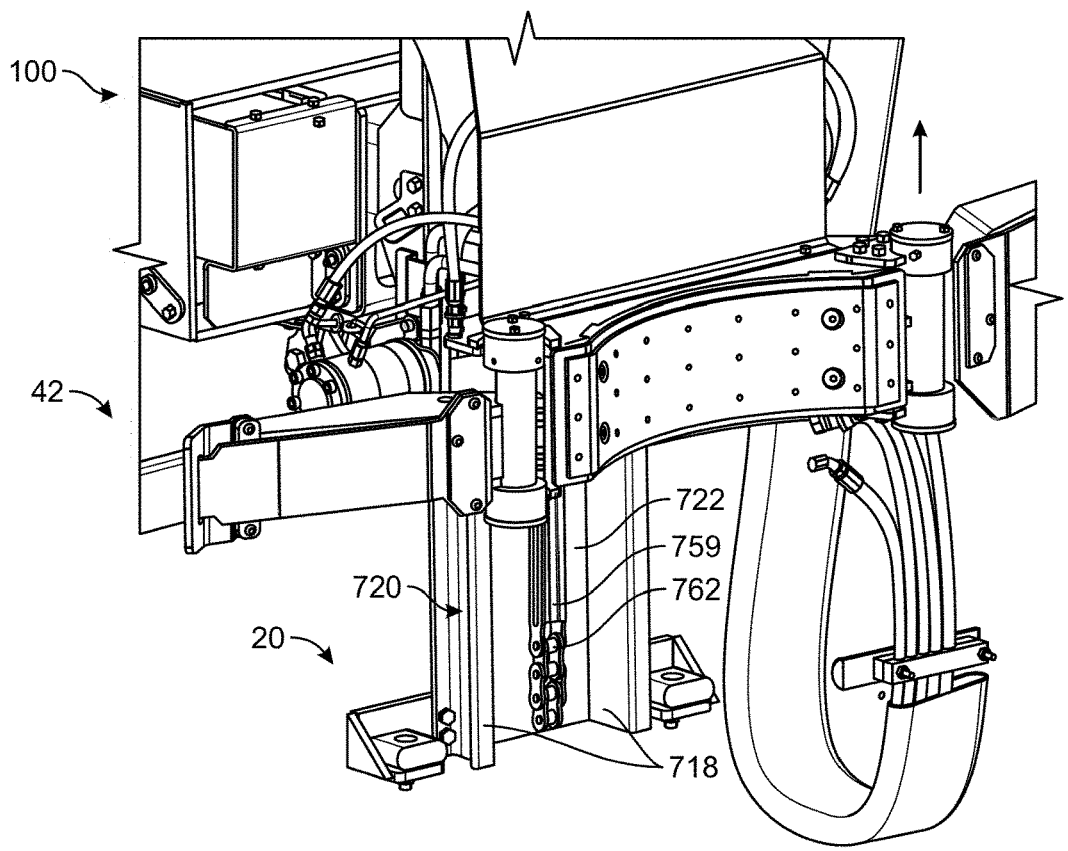
FIG. 7 is a perspective view of an electric lift assembly with a stationary chain that can be used on the refuse vehicle of FIG. 1, according to an exemplary embodiment.

Referring now to FIG. 7, track 20 can include a stationary chain 759 that is configured to mesh with corresponding teeth of a drive sprocket. The drive sprocket can be the same as or similar to sprocket 758. In some embodiments, the drive sprocket is positioned or mounted (e.g., removably or fixedly coupled) with driveshaft 704 similarly to roller pinon 712 and/or sprocket 758.

Stationary chain 759 can extend along substantially the entire path of track 20. In some embodiments, stationary chain 759 is adjacent an exterior surface of web portion 722. For example, stationary chain 759 can lie on the exterior surface of web portion 722. Stationary chain 759 includes linkages 762. Linkages 762 can define a space therebetween that is configured to receive and mesh with teeth of the drive sprocket. In some embodiments, the drive sprocket is configured to mesh with stationary chain 759 as carrier 26 and grabber assembly 42 translate along the entire path of track 20. The drive sprocket can impart a lifting force therebetween carrier 26 and grabber assembly 42 and stationary chain 759 to lift carrier 26 and grabber assembly 42 along track 20. Stationary chain 759 can be coupled at opposite ends with track 20. In some embodiments, stationary chain 759 is pre-loaded in tension such that stationary chain 759 functions as a substantially rigid track member.

Referring now to FIGS. 8, 13, 17, and 18, track 20 can be split along straight portion 27. Track 20 can be coupled with a reach assembly 800. A bottom or lower portion 902 of track 20 (e.g., a lower portion of the two-piece track 20) can be coupled with a bar, a beam, an elongated member, etc., shown as inner member 804 of reach assembly 800. Inner member 804 can be received within a bar, a beam, an elongated member, etc., of reach assembly 800, shown as outer member 802. Outer member 802 can include a hollow portion, a channel, a groove, an inner volume, etc., configured to receive inner member 804 therewithin. Inner member 804 can be slidably coupled with one or more inner surfaces of outer member 802. In some embodiments, inner member 804 is configured to translate relative to outer member 802 to extend or retract reach assembly 800, thereby translating track 20 (and carrier 26 and grabber assembly 42) outwards. Reach assembly 800 facilitates reaching refuse containers with grabber assembly 42 that may be positioned a distance away from refuse vehicle 10. It should be understood that while reach assembly 800 is shown as a telescoping apparatus with an inner and outer member, reach assembly 800 can include any number of telescoping portions to improve an overall reach capability (e.g., a maximum extension length) of grabber assembly 42. The various telescoping members can be driven to extend or retract using an electric motor, a linear electric actuator, gearboxes, etc., thereby providing a fully-electric reach assembly 800.

For example, track 20 can be a distance 806 from outer member 802. When reach assembly 800 is fully retracted, distance 806 is substantially equal to zero (e.g., inner member 804 is fully received therewithin outer member 802). Inner member 804 can translate relative to outer member 802 to increase or decrease distance 806.

In some embodiments, reach assembly 800 translates or moves lower portion 902 of track 20 relative to an upper or top portion 904 of track 20 in a longitudinal direction defined by a longitudinal axis 808 of outer member 802. Lower portion 902 of track 20 and upper portion 904 of track 20 can be configured to translate apart from each other and back together to fully define track 20. In some embodiments, lower portion 902 includes an exterior or upper surface 778. Upper surface 778 can be angled and is configured to interface with and/or contact a correspondingly shaped and angled lower surface 776 of upper portion 904. When reach assembly 800 is operated to extend, inner member 804 extends relative to outer member 802 and upper surface 778 of lower portion 902 moves away from lower surface 776 of upper portion 904 (shown in FIG. 17). When reach assembly 800 is operated to retract (e.g., to decrease in overall length), inner member 804 retracts relative to outer member 802 (e.g., distance 806 is decreased) until upper surface 778 of lower portion 902 is substantially adjacent (e.g., removably coupled with, contacts) lower surface 776 of upper portion 904 (shown in FIG. 18).

Lower portion 902 can include a guide member, an alignment member, etc., shown as alignment member 768 positioned at an upper end thereof. In some embodiments, alignment member 768 is configured to be received within or slidably couple with an inner volume 774 of a receiving member 770 of upper portion 904. Inner volume 774 of receiving member 770 can have a shape that corresponds to alignment member 768 and is configured to receive alignment member 768 therewithin. Alignment member 768 can be positioned at a lower end of upper portion 904.

In some embodiments, alignment member 768 includes outwardly extending portions, guide members, protrusions, rollers, blocks, etc., shown as guide members 772. Guide member 772 are configured to be received within grooves, tracks, recesses, inner volumes, cavities, etc., of inner volume 774 of receiving member 770. Guide members 772 can slidably couple with corresponding inner surfaces of inner volume 774. In some embodiments, guide members 772 and inner volume 774 facilitate alignment therebetween lower portion 902 and upper portion 904 of track 20 such that when guide members 772 are received within inner volume 774, channels 720 of upper portion 904 and lower portion 902 are aligned (e.g., such that a continuous channel is formed).

Upper portion 904 of track 20 can be coupled (e.g., fixedly coupled, mounted, etc.) with an upper portion of refuse vehicle 10. In some embodiments, upper portion 904 of track 20 is mounted on the body of refuse vehicle 10. For example, upper portion 904 of track 20 can be mounted to a hopper or vehicle body of refuse vehicle 10.

Inner member 804 can be configured to translate relative to outer member 802 with an electric motor, a hydraulic system (e.g., a hydraulic cylinder), an engine, etc. In some embodiments, inner member 804 is configured to translate relative to outer member 802 due to extension and retraction of an electric linear actuator. In some embodiments, the electric linear actuator and/or the electric motor includes feedback sensors and a brake. In some embodiments, a brake is included therebetween outer member 802 and inner member 804. The brake can be transitioned into an activated state such that a current position of inner member 804 relative to outer member 802 is substantially locked. For example, when inner member 804 is translated relative to outer member 802 to the configuration/position shown in FIG. 18, the brake can be transitioned into the activated state to maintain the current configuration/position as grabber assembly 42 is driven to translate along track 20 and empty refuse into the hopper of refuse vehicle 10.

In some embodiments, the sensor is an extension sensor, a distance sensor, a feedback sensor on the electric linear motor or the electric motor, etc. in some embodiments, the brake is transitioned into and out of the activated state by a controller. In some embodiments, the controller is also configured to receive sensor signals from the sensor to identify and track a current position of lower portion 902 relative to upper portion 904 (e.g., to monitor a current degree of extension of inner member 804 relative to outer member 802). In some embodiments, the controller restricts lifting and dumping operations (e.g., restricts operation of electric motors to translate carrier 26 and grabber assembly 42) if lower portion 902 is not aligned with upper portion 904 (e.g., if lower portion 902 is not in the configuration shown in FIG. 18).

Using a split ladder structure as shown in FIGS. 8, 13, and 17-18, facilitates reducing overhand mass of lift assembly 100. This reduces the weight of lift assembly 100 that is supported by reach assembly 800 and may facilitate lowered bending stresses at inner member 804 and/or outer member 802. Additionally, inertial forces exerted on upper portion 904 of track 20 (e.g., due to carrier 26 and grabber assembly 42 translating along upper portion 904 of track 20) can be absorbed by the hopper or body portion of refuse vehicle 10 to which upper portion 904 is coupled.

Figure 14:
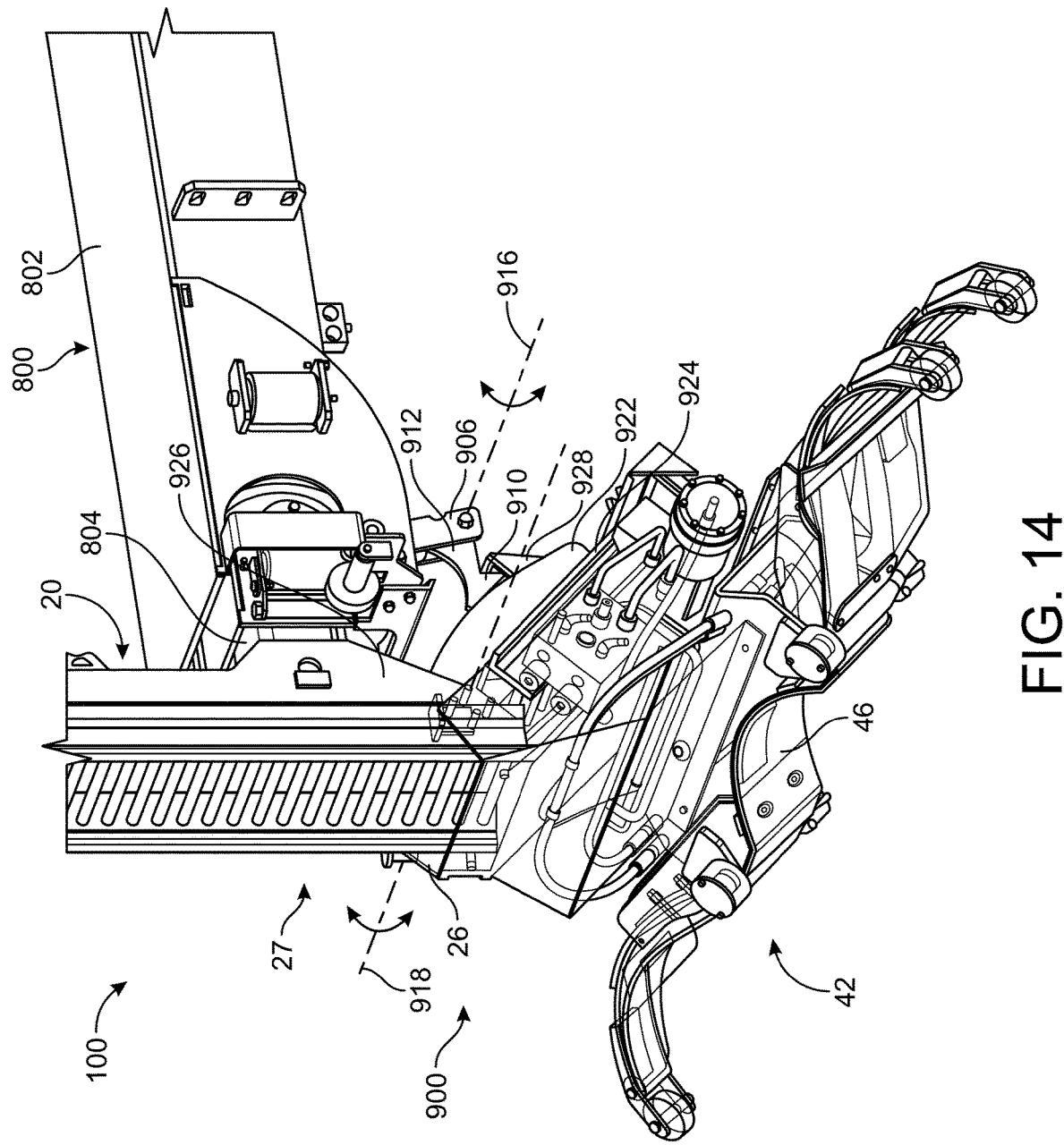
FIG. 14 is a perspective view of an electrically powered grabber assembly storage apparatus that can be used with a lift assembly, according to an exemplary embodiment.
Figure 15:
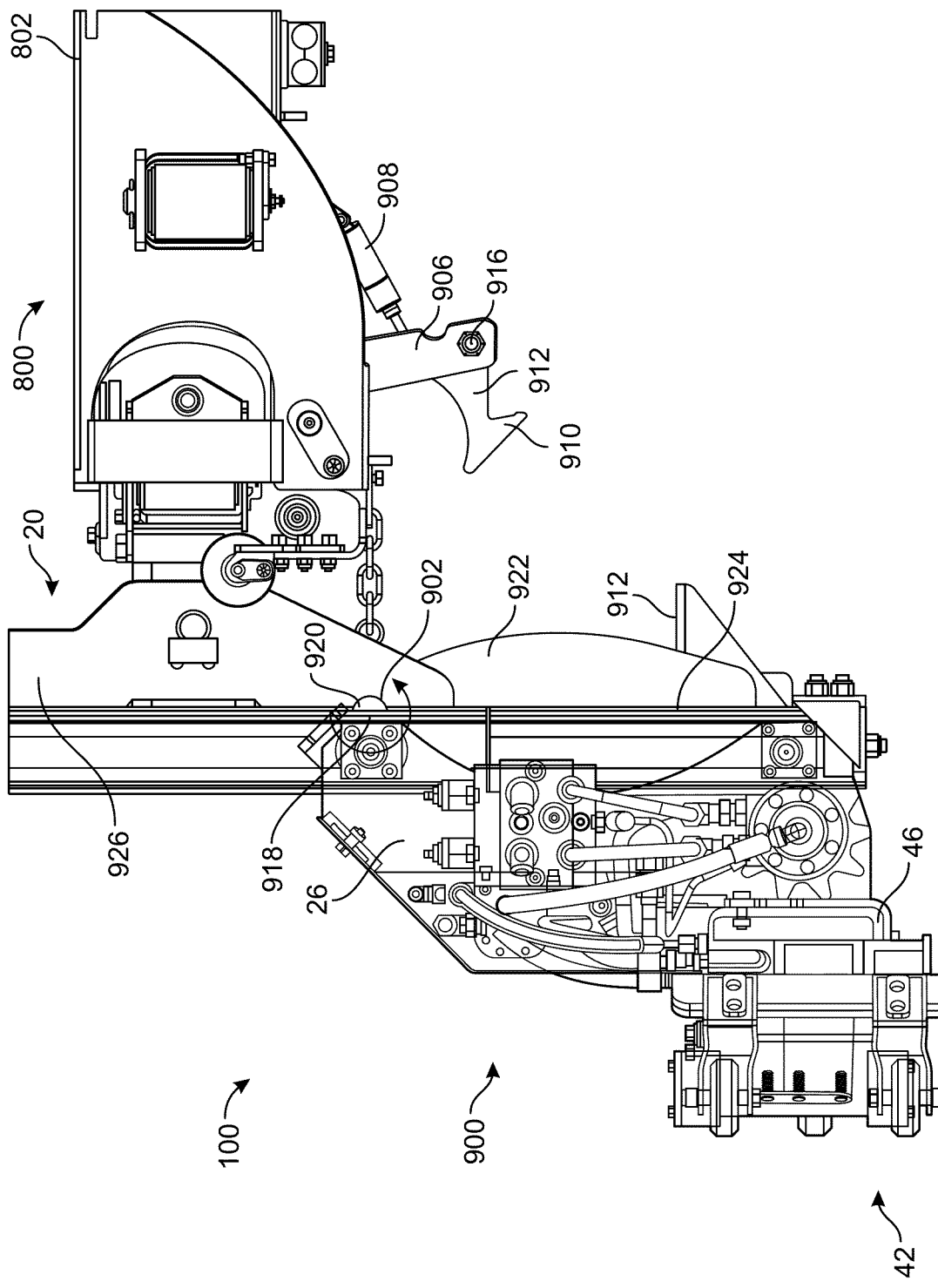
FIG. 15 is a side view of the electrically powered grabber assembly storage apparatus of FIG. 13 in a first configuration, respectively, according to an exemplary embodiment.
Figure 16:
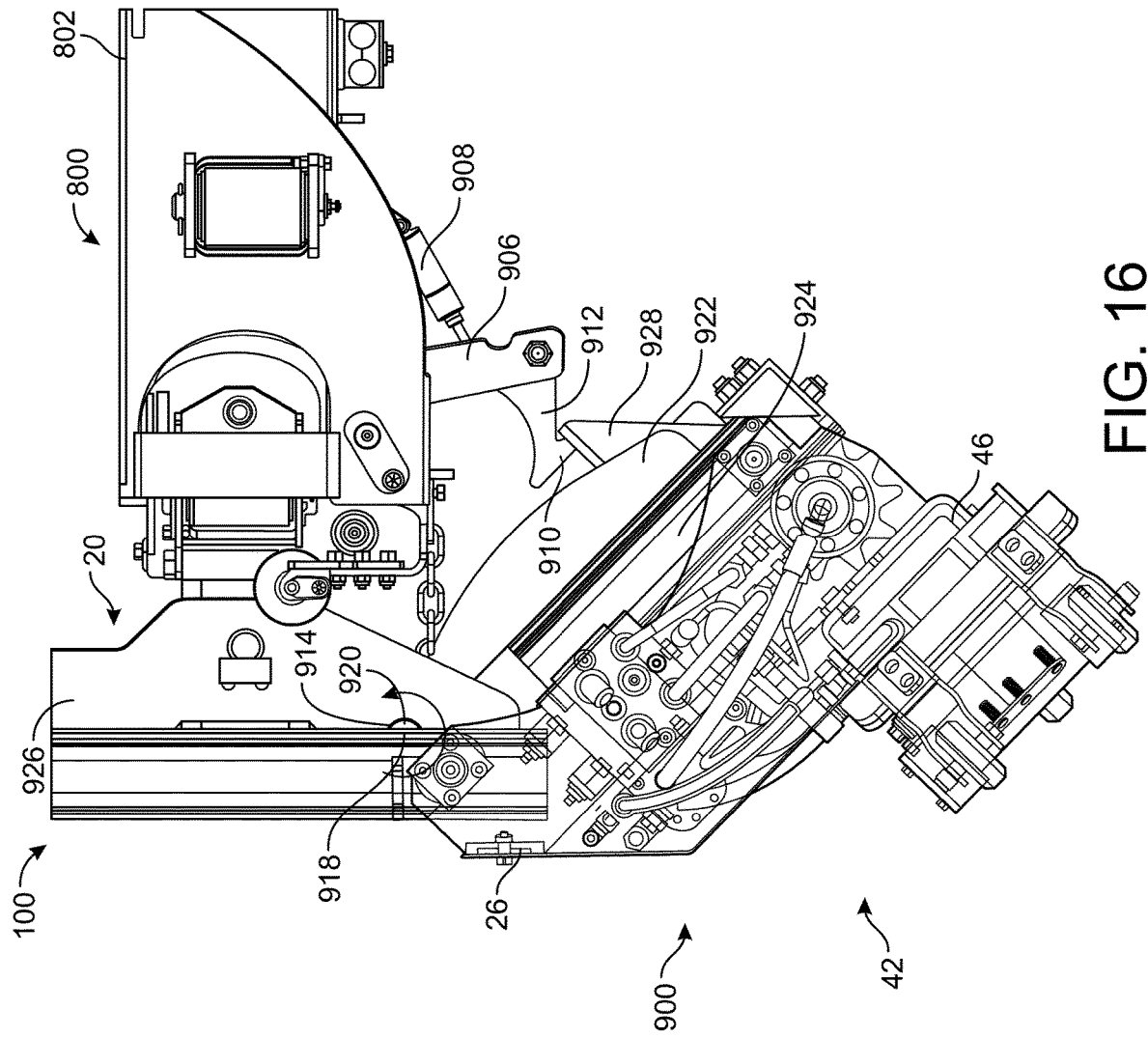
FIG. 16 is a side view of the electrically powered grabber assembly storage apparatus of FIG. 13 in a second configuration, respectively, according to an exemplary embodiment.
Figure 17:
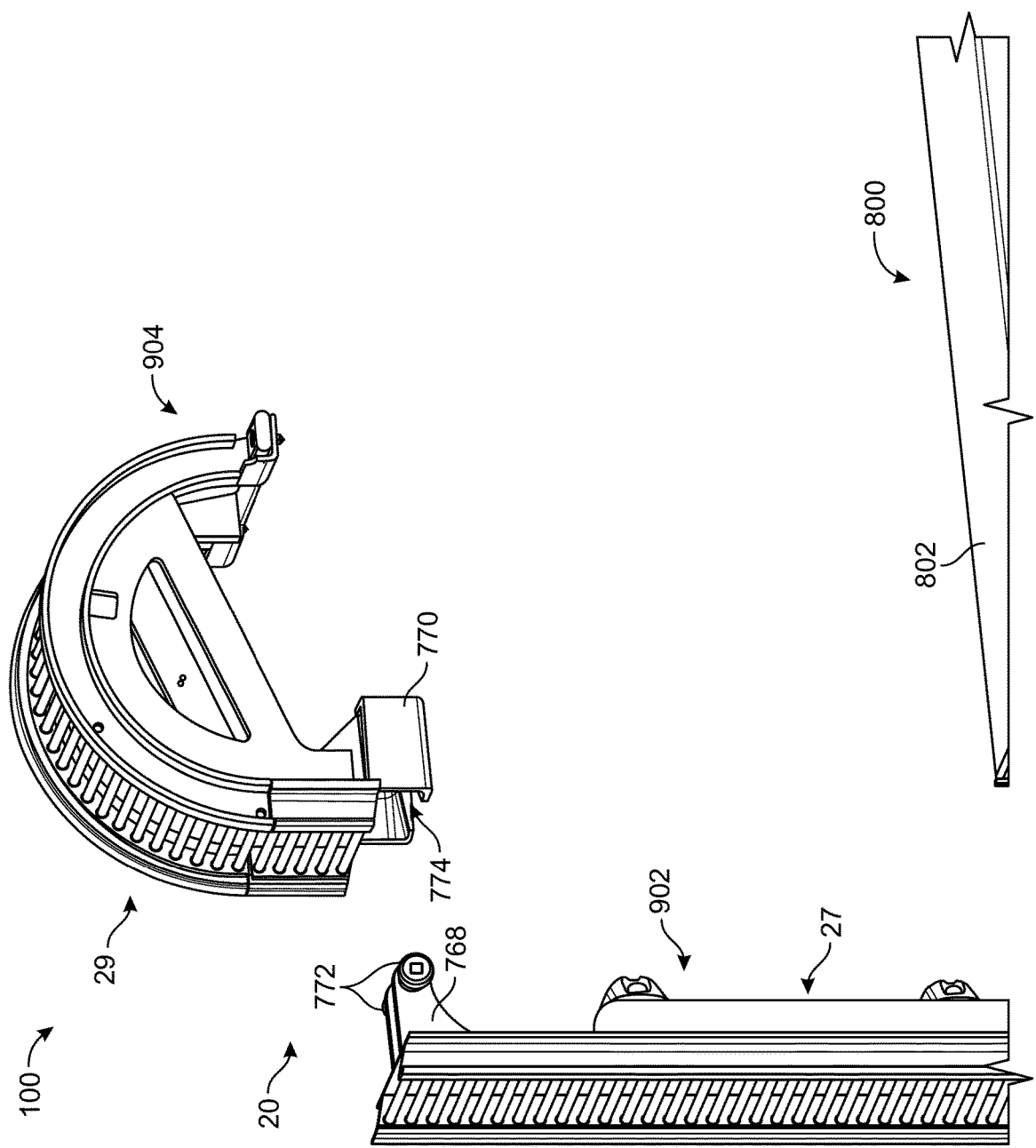
FIG. 17 is a perspective view of the electric lift assembly of FIG. 8 in a first configuration, according to an exemplary embodiment.
Figure 18:
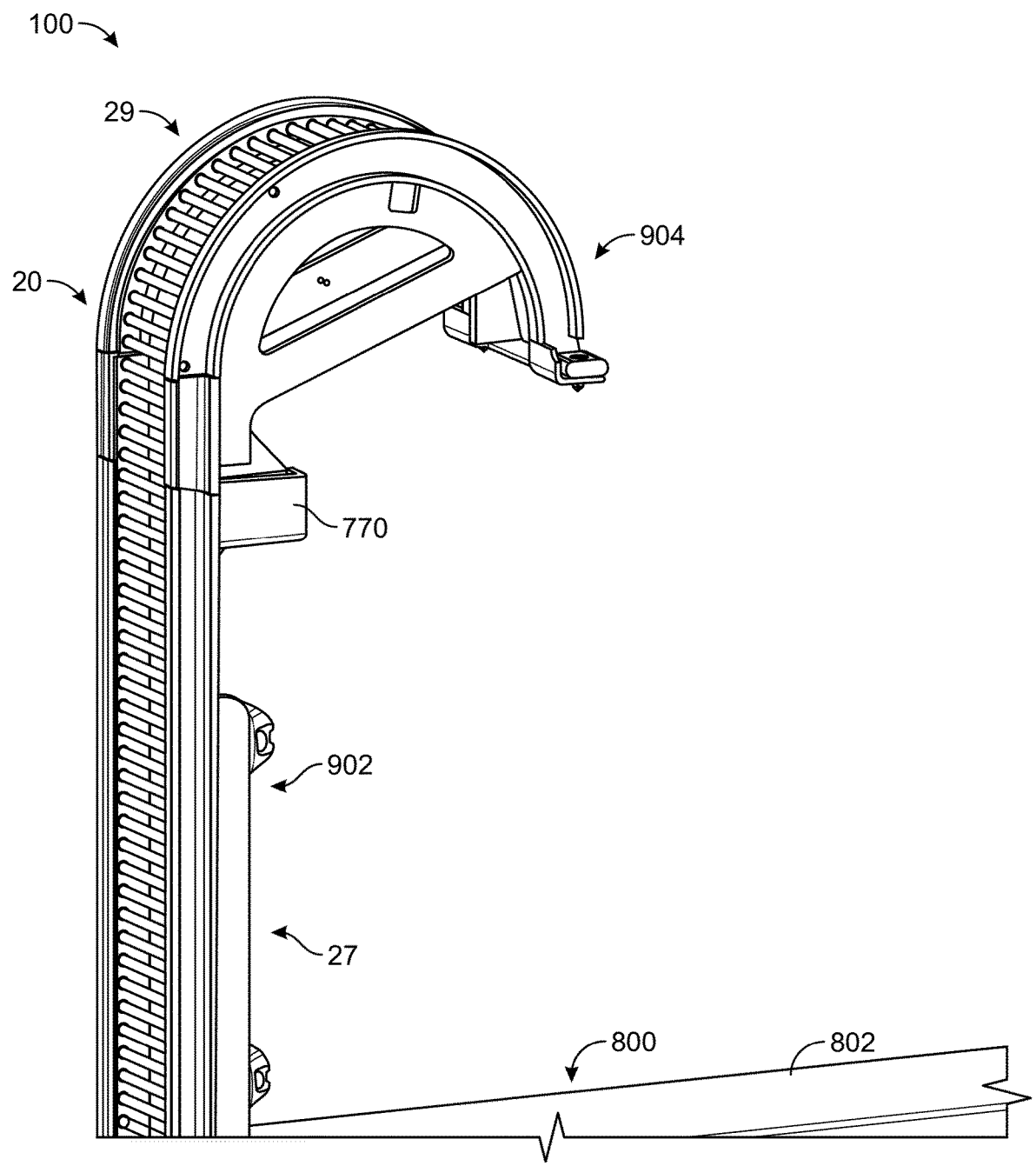
FIG. 18 is a perspective view of the electric lift assembly of FIG. 8 in a second configuration, according to an exemplary embodiment.

Referring now to FIGS. 14-16, a storage apparatus 900 can be used to rotate carrier 26 and/or grabber assembly 42 under a chassis or frame 12 of refuse vehicle 10. Storage apparatus 900 can be used in any of the embodiments of lift assembly 100 described herein.

Storage apparatus 900 includes a pivotally coupled or rotatable end portion 924 of track 20. End portion 824 can be a part (e.g., a bottom end) of straight portion 27 of track 20. End portion 924 can be fixedly coupled or integrally formed with a bar, a beam, a structural member, linkage, etc., shown as pivotal member 922. Pivotal member 922 includes a protrusion, a tab, a cylindrical protrusion, a post, a pin, etc., shown as pin 920. Pin 920 extends therethrough and slidably couples with a correspondingly shaped aperture, hole, bore, etc., of a rear track portion 926, shown as apertures 914. Aperture 914 extends therethrough rear track portion 926 and receives pin 920 such that pin 920 and pivotal member 922 can rotate about axis 918. Axis 918 extends through a center point of pin 920 and/or aperture 914.

Storage apparatus 900 can include two pivotal members 922 laterally spaced apart from each other and configured to rotatably or pivotally couple with rear track portions 926. Rear track portions 926 can be integrally formed with track 20 and can protrude towards reach assembly 800. Rear track portions 926 can be generally flat or planar members that define apertures 914 therethrough.

Pivotal member 922 extends therebetween rear track portions 926 and rotatable end portion 924 of track 20. Pivotal member 922 can be configured to rotate, pivot, or swing about axis 918 to swing carrier 26, end portion 924, and grabber assembly 42 in a clockwise or counter clockwise direction. In some embodiments, pivotal members 922 are driven to rotate about axis 918 by an electric linear actuator or an electric motor. End portion 924 includes a receiving portion, a coupling member, a latch member, etc., shown as receiving portion 928. Receiving portion 928 can include a slot, a recess, a latch, a channel, a groove, a hook, etc., configured to removably couple with a hook 910 of a latch member 912. Latch member 912 is pivotally coupled with a support member, a bar, an elongated member, a beam, etc., shown as support member 906 such that latch member 912 can rotate or pivot about axis 916 relative to support member 906. Support member 906 can extend from a bottom surface of reach assembly 800. In some embodiments, support member 906 extends from a bottom surface of outer member 802 in a generally downwards direction.

Storage apparatus 900 include a hydraulic cylinder, a telescoping member, an electric linear actuator, etc., shown as linear actuator 908. Linear actuator 908 is pivotally coupled at one end with reach assembly 800, and at an opposite end with latch member 912. Linear actuator 908 can be driven to extend or retract to pivot/rotate latch member 912 about axis 916. In other embodiments, latch member 912 is driven to pivot/rotate about axis 916 by an electric motor.

Referring particularly to FIGS. 15-16, pivotal member 922 can be driven to rotate between a first orientation (shown in FIG. 15) and a second orientation (shown in FIG. 16). In some embodiments, when storage apparatus 900 is in the first orientation, end portion 924 of track 20 is aligned with track 20 such that a continuous track is defined. When storage apparatus 900 is in the first orientation, carrier 26 and grabber assembly 42 can be driven to translate along track 20 to lift and dump a releasably secured refuse bin.

Storage apparatus 900 can transition into the second orientation by rotating pivotal member 922 about axis 918 in a clockwise direction. In some embodiments, latch member 912 is rotated about axis 916 such that latch member 912 and/or hook 910 is not in a path of motion of receiving portion 928. Once pivotal member 922 is transitioned into the second configuration, latch member 912 can be driven to rotate/pivot about axis 916 in a counter clockwise direction until hook 910 engages the correspondingly shaped recess, slot, hook, etc., of receiving portion 928.

Advantageously, the engagement/coupling between hook 910 of latch member 912 and receiving portion 928 locks storage apparatus 900 in the second orientation. Storage apparatus 900 can remain in the second orientation until it is operated to transition back into the first orientation. Storage apparatus 900 can be transitioned into the second orientation when refuse vehicle 10 is on the highway, between collection stops, or when powered/shut off. Advantageously, storage apparatus 900 can reduce an overall width of refuse vehicle 10 and can protect grabber assembly 42 by reducing the likelihood of grabber assembly 42 contacting obstacles while refuse vehicle 10 is driving.

Storage apparatus 900 can be transitioned from the second orientation to the first orientation by operating latch member 912 to disengage receiving portion 928 (e.g., by operating linear actuator 908 such that latch member 912 rotates/pivots about axis 916 in the clockwise direction). After hook 910 of latch member 912 is disengaged from receiving portion 928, pivotal member 922 can be driven to rotate about axis 918 in the clockwise direction until pivotal member 922, carrier 26, and grabber assembly 42 are in the orientation shown in FIG. 14.

It should be understood that storage apparatus 900 shown in FIGS. 14-16, and the split ladder configuration shown in FIGS. 8, 13, and 17-18 can be used with either ladder assembly 750 or with the embodiment of track 20 shown in FIG. 6, or with the embodiment of track 20 shown in FIG. 7.

Figure 9:
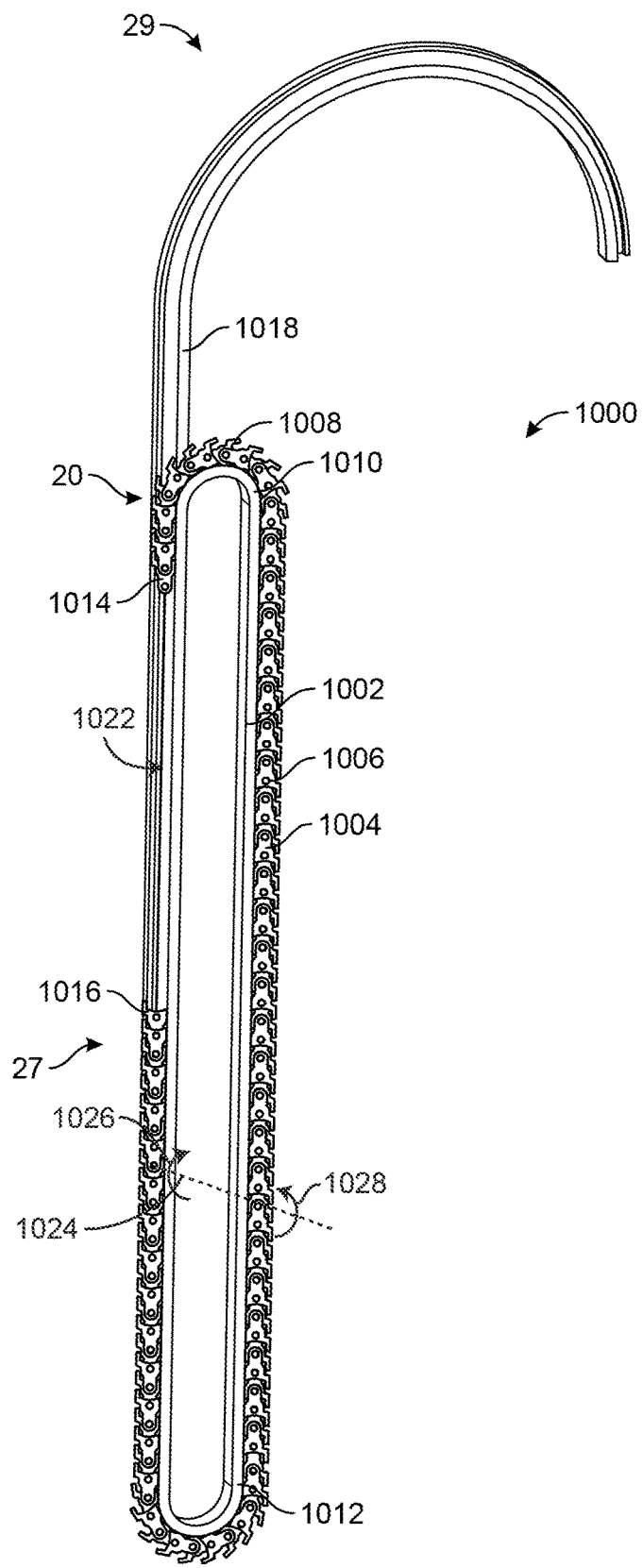
FIG. 9 is a perspective view of a push chain that can be driven by an electric motor to exert a pushing force on a carrier and grabber assembly to translate the carrier and grabber assembly along a track, according to an exemplary embodiment.

Referring now to FIG. 9, a push chain assembly 1000 can be used to drive carrier 26 and grabber assembly 42 along track 20. In some embodiments, push chain assembly 1000 includes track 20 and a push chain 1004. In some embodiments, track 20 includes a first rail, a first elongated member, a first track member, a first guide member, etc., shown as a first member 1030, and a second rail, a second elongated member, a second track member, a second guide member, etc., shown as second member 1002. Push chain 1004 that is configured to slidably couple with first member 1030 and second member 1002. Push chain 1004 can include linkages 1006 that rotatably or pivotally couple with each other. In some embodiments, linkages 1006 are consecutively coupled with each other. In some embodiments, linkages 1006 are each pivotally coupled with adjacent linkages 1006 with a pin, a post, a cylindrical member, etc., shown as pin 1020. Linkages 1006 can each include a protrusion 1008 that extends from one side of linkage 1006. In some embodiments, protrusion 1008 extends alongside and beyond the post or pin 1020 of an adjacent or neighboring linkage.

Protrusions 1008 facilitate preventing push chain 1004 from bending or contorting in one direction (e.g., preventing push chain 1004 from falling, drooping, bending, deflecting, deforming, curving, etc.) but allow push chain 1004 to curve or contort in an opposite direction. For example, push chain 1004 can be configured to curve inwards about an upper bend 1010 and bottom bend 1012 of second member 1002, but may be prevented from curving outwards. In some embodiments, second member 1002 is laterally offset from first member 1030.

Push chain 1004 is configured to receive an exerted force (e.g., a pushing force, a compressive force, etc.) and translate or slide along first member 1030 and second member 1002. In some embodiments, an electric motor including a driveshaft and a driving sprocket is configured to rotatably couple with push chain 1004 at upper bend 1010 or bottom bend 1012 to drive push chain 1004 to translate along track 20 and/or along second member 1002. In some embodiments, second member 1002 and first member 1030 include a channel, a groove, a recess, etc., shown as groove 1018 that extends or runs along substantially an entire path length of first member 1030 and second member 1002. In some embodiments, the groove 1018 extends continuously along an outer surface of second member 1002 and track 20. In some embodiments, first member 1030 includes a groove configured to translatably couple with push chain 1004 that is continuous with the groove or track of second member 1002. In some embodiments, pins 1020 of linkages 1006 are configured to be received within and slide along groove 1018. In some embodiments, pins 1020 of linkages 1006 are configured to be received within and slide along groove 1018 when the linkages 1006 move along first member 1030. In some embodiments, protrusions 1008 of linkages 1006 or an inner portion of linkages 1006 are configured to be received within and slide along a groove, track, recess, etc., shown as groove 1022 when linkages 1006 move along second member 1002.

Pins 1020 can extend in or define a first direction (e.g., along a longitudinal axis of the refuse vehicle 10) while protrusions 1008 may extend in or define a second direction (e.g., along a lateral axis of the refuse vehicle 10). In some embodiments, the first direction and the second direction are perpendicular or orthogonal with each other. For example, the groove 1018 may have a depth in the first direction to receive the pins 1020, while the groove 1022 may have a depth in the second direction to receive the protrusion 1008.

Push chain 1004 includes a first end 1014 and a second end 1016, according to some embodiments. In some embodiments, second end 1016 is free and is translatably coupled with the groove that extends continuously along second member 1002 and/or first member 1030. In some embodiments, second end 1016 is coupled (e.g., fixedly) with a connecting portion of carrier 26. In some embodiments, second end 1016 is coupled (e.g., fixedly, pivotally, removably, rotatably, etc.) with a bottom portion of grabber assembly 42 and/or carrier 26. As push chain 1004 is driven to translate or slide along second member 1002 and/or first member 1030, second end 1016 can exert a pushing force on carrier 26 and/or grabber assembly 42. Second end 1016 can provide the pushing force on carrier 26 and/or grabber assembly 42 along substantially an entire path of motion of carrier 26 and/or grabber assembly 42. In some embodiments, carrier 26 is configured to translate upwards along straight portion 27 of track 20 and along curved portion 29 of track 20. Second end 1016 of push chain 1004 can be configured to provide the pushing force to carrier 26 and/or grabber assembly 42 along substantially the entire path of motion of carrier 26 and/or grabber assembly 42 as carrier 26 and grabber assembly 42 translate along straight portion 27 and curved portion 29 of track 20. In this way, the electric motor can drive push chain 1004 to translate carrier 26 and grabber assembly 42 to lift, tilt, and dump a refuse container.

Linkages 1006 can form a compressive load bearing structure so that a pushing force can be transferred through push chain 1004 to drive a carrier assembly that is positioned at second end 1016 to ascend. In some embodiments, each pin 1020 defines an axis 1024 that extends in the first direction. Subsequent linkages 1006 may be restricted from rotating in direction 1028 due to protrusions 1008. Linkages 1006 may be restricted or prevented from rotating in direction 1026 due to engagement between linkages 1006 and track 20 and/or second member 1002 (e.g., due to the engagement between pins 1020 and groove 1018 or due to the engagement between a portion of linkages 1006 and groove 1022). In this way, a pushing force may transfer through linkages 1006 (e.g., through pins 1020) of push chain 1004 as a compressive force and provided to second end 1016 (or grabber assembly 42 that is positioned at second end 1016).

Figure 10:
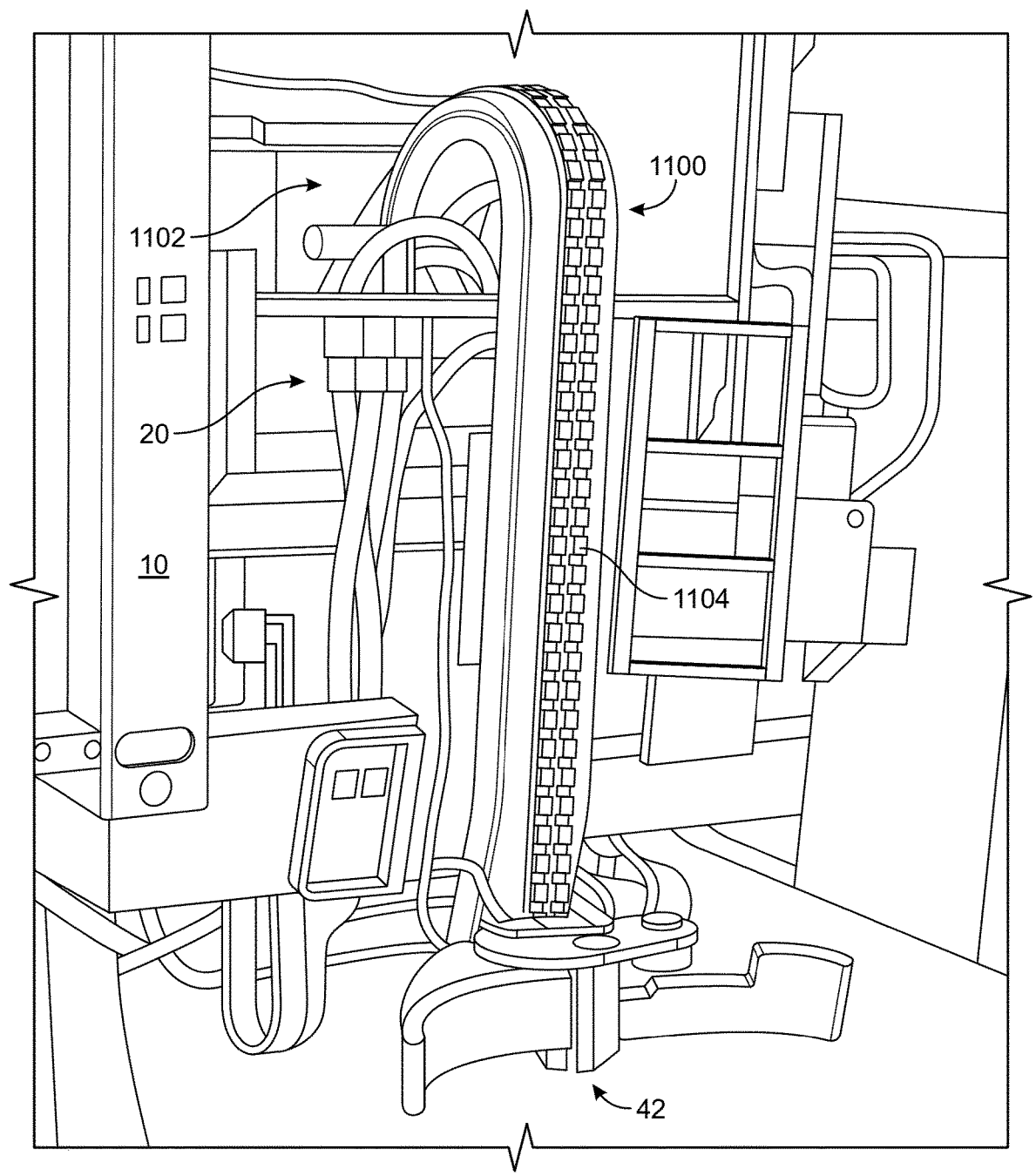
FIG. 10 is a perspective view of a refuse vehicle with a track and a pull chain that can exert a pulling force on a grabber assembly to translate the grabber assembly along the track, according to an exemplary embodiment.

Referring now to FIG. 10, an electrically powered lift assembly 1100 is shown, according to an exemplary embodiment. Electrically powered lift assembly 1100 can be the same as or similar to any of the other lift assemblies described herein and may share any features, components, configurations, functionality, etc., of the various lift assemblies described herein.

Electrically powered lift assembly 1100 includes a cable, a belt, a chain, a tensile member, a flexible member, a band, a deformable member, a contortable member, etc., shown as power transmitting band 1104. Power transmitting band 1104 can be any elongated member that can bend or contort and can be loaded in tension (and/or compression) to provide a pulling force to grabber assembly 42 (or to carrier 26). Power transmitting band 1104 can be driven by an electric motor 1102 to pull grabber assembly 42 upwards along track 20. In some embodiments, an end of power transmitting band 1104 is coupled with a portion, surface, member, etc., of grabber assembly 42 to provide the pulling force to grabber assembly 42. Power transmitting band 1104 can extend along an outer surface, an outer periphery, etc., of track 20. In some embodiments, power transmitting band 1104 extends along or through a groove, a channel, a recess, a track, etc., of track 20. Power transmitting band 1104 can slidably couple with the groove that extends along track 20.

Advantageously, the lift assemblies described herein are fully electric systems or are configured to be driven by electric motors, thereby facilitating a fully electric lifting apparatus that can be used on side loading, rear loading, or front loading refuse vehicles. While the various electric systems described herein are shown implemented with a specific grabber assembly, any of the electric systems, the electric rack and pinion systems, the gearing systems, electric linear actuators, electric motors, etc., or components thereof can be used with various grabber assemblies. Advantageously, a fully-electric lift assembly reduces the need for a hydraulic system, is more environmentally friendly, and facilitates a more robust lifting apparatus.

It should be understood that any of the electric motors, electric linear actuators, electric devices, etc., can receive electrical energy/power from a battery system including one or more battery devices or any other energy storage devices. These batteries may be charged from an engine of the refuse vehicle and can be discharged to the various electrical components to power the lift assembly. Additionally, any of the electric motors, electric linear actuators, or electrical devices described herein can be operated by a controller or a control system. The controller can include a processing circuit, memory, a processor, computer readable medium, etc., and may store instructions for operating any of the functions of a lift assembly. The controller can generate control signals and provide the control signals to any of the electrical devices (e.g., the electric motors) described herein to operate the lift assembly.

It should also be noted that any of the electric motors, electric linear actuators, etc., can include a brake that can lock or facilitate restricting rotational output from an output driveshaft of any of the electric motors. For example, any of the electric motors can include a drum brake configured to activate and provide a frictional force to the electric motor driveshaft to facilitate preventing rotation of the driveshaft thereof. The brake can be activated using mechanical systems, or an electrical system. For example, the brake may be an electrically activated drum brake, a mechanical brake, an electrical brake, etc. The brake can be configured to decrease output speed of the driveshaft of the electric motor or to facilitate locking a current angular position of the driveshaft of the electric motor. The brake can be operated by the same controller or control system that operates the electric motors and electric linear actuators, or can be operated by a separate control system and/or a separate controller. Additionally, any of the electric motors or linear electric actuators described herein can include appropriate gearboxes to increase or decrease output torque.

It should also be noted that any of the electrical motors, electrical actuators, or any other electrical movers can include any number of sensors configured to measure and monitor an angular position or a degree of extension. In some embodiments, the sensors are a component of the electric motors or the electric linear actuators and provide feedback signals to the controller. The controller can monitor the sensor signals to identify an angular position or a degree of extension of the electric motors or the electric linear actuators, respectively. The controller can use the sensor signal to determine a current position of grabber assembly 42 and/or carrier 26 along track 20 (or to determine a current degree of extension of reach assembly 800). In some embodiments, a current position of carrier 26 and/or grabber assembly 42 along track 20 is measured directly with a sensor and is provided to the controller (e.g., using a proximity sensor, a distance sensor, a camera, etc.). Sensors or electric motor feedback signals can also be used with storage apparatus 900 to monitor a current orientation or configuration of storage apparatus 900. The sensor signals can be provided to the controller.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A fully-electric lift assembly for a refuse vehicle, the fully-electric lift assembly comprising:
    a track comprising a plurality of channels that extend along an entire length of a path of the track and an end portion at a bottom end of the track, wherein the end portion is rotatably coupled with the track and configured to pivot inwards towards the refuse vehicle;
    a carrier configured to translate along the path of the track, the carrier comprising:
        a plurality of slidable members, each configured to slidably couple with the track at a corresponding one of the plurality of channels;
        an electric motor configured to drive a shaft; and
        at least one of:
            a roller pinion rotatably coupled with the shaft and configured to engage a rack of the track to drive the carrier to ascend along the track;
            a gear rotatably coupled with the shaft and configured to engage a plurality of rungs of the track to drive the carrier to ascend along the track; or
            a sprocket rotatably coupled with the shaft and configured to engage a fixed chain that extends along the track to drive the carrier to ascend along the track.

2. The lift assembly of claim 1, wherein the track comprises an upper portion and a lower portion, wherein the upper portion is fixedly coupled with the refuse vehicle, and the lower portion is configured to translate relative to the upper portion between an extended position and a retracted position, wherein the upper portion and the lower portion align to define the path of the track when in the retracted position.

3. The lift assembly of claim 2, wherein the lower portion is coupled with a reach assembly configured to drive the lower portion to translate relative to the upper portion.

4. The lift assembly of claim 1, wherein the end portion comprises a receiving portion configured to releasably engage a hook, wherein the hook releasably secures the carrier at an inwards orientation relative to a body of the refuse vehicle.

5. The lift assembly of claim 1, wherein the carrier is configured to translate to the end portion of the track, wherein the end portion of the track and the carrier are configured to rotate inwards towards a body of the refuse vehicle to stow the carrier at a first position, and rotate outwards to a second position for movement of the carrier along the track.

6. The lift assembly of claim 1, wherein the carrier is a grabber assembly and comprises:
    a carriage; and
    a plurality of grabber arms configured to pivot or rotate relative to the carriage.

7. The lift assembly of claim 1, wherein the track comprises a set of rails offset from each other and extending along the path of the track and a web portion extending between the set of rails, wherein the plurality of rungs extend between the set of rails.

8. The lift assembly of claim 1, wherein the track comprises a set of rails offset from each other and extending along the path of the track and a web portion extending between the set of rails, wherein the rack is positioned between the set of rails and extends along the web portion.

9. The lift assembly of claim 1, wherein the track comprises a set of rails offset from each other and extending along the path of the track and a web portion extending between the set of rails, wherein the fixed chain is positioned between the set of rails and extends along the web portion.

10. The lift assembly of claim 1, wherein the track comprises a straight portion and a curved portion.

11. A refuse vehicle comprising:
    a chassis;
    a plurality of tractive elements coupled with the chassis and configured to support the refuse vehicle;
    a reach assembly coupled with the refuse vehicle; and a fully-electric lift assembly coupled with the reach assembly and comprising:
- a track comprising a plurality of channels that extend along an entire length of a path of the track and a plurality of engagement members, and an end portion at a bottom end of the track, wherein the end portion is rotatably coupled with the track and configured to pivot inwards towards the refuse vehicle;
- a carrier assembly configured to move along the path of the track;
- an electric motor fixedly coupled with the carrier assembly and configured to drive a driveshaft;
- a drive member rotatably fixedly coupled with the driveshaft and configured to engage the plurality of engagement members to drive the carrier assembly to ascend or descend along the track.

12. The refuse vehicle of claim 11, wherein the reach assembly is configured to extend or retract to move the fully-electric lift assembly relative to the refuse vehicle.

13. The refuse vehicle of claim 11, wherein the track comprises:
- a first rail and a second rail extending along the path of the track wherein the first rail and the second rail are positioned apart from each other and a web member extends between the first rail and the second rail.

14. The refuse vehicle of claim 13, wherein the plurality of engagement members are rungs, wherein the rungs extend between the first rail and the second rail and are spaced apart from each other along the path of the track.

15. The refuse vehicle of claim 13, wherein the plurality of engagement members are teeth of a rack, wherein the rack is positioned between the first rail and the second rail and extends along the web member along the path of the track.

16. The refuse vehicle of claim 11, wherein the track comprises an upper portion and a lower portion, wherein the upper portion and is fixedly coupled with the refuse vehicle, and the lower portion is configured to translate relative to the upper portion between an extended position and a retracted position, wherein the upper portion and the lower portion align to define the path of the track when in the retracted position.

17. The refuse vehicle of claim 11, wherein the track comprises a straight portion and a curved portion.

* * * * *